US012520776B2

(12) United States Patent
Angles et al.

(10) Patent No.: US 12,520,776 B2
(45) Date of Patent: Jan. 13, 2026

(54) DEVICE AND METHOD FOR REPEATEDLY INSTALLING DRIP IRRIGATION EMITTERS

(71) Applicants: Jacob Angles, Paso Robles, CA (US); Ricardo Tan, San Luis Obispo, CA (US)

(72) Inventors: Jacob Angles, Paso Robles, CA (US); Ricardo Tan, San Luis Obispo, CA (US)

(73) Assignee: Jacob Angles, Paso Robles, CA (US)

( * ) Notice: Subject to any disclaimer, the term of this patent is extended or adjusted under 35 U.S.C. 154(b) by 278 days.

(21) Appl. No.: 18/199,961

(22) Filed: May 21, 2023

(65) Prior Publication Data
US 2024/0224900 A1 Jul. 11, 2024

Related U.S. Application Data

(60) Provisional application No. 63/437,719, filed on Jan. 8, 2023.

(51) Int. Cl.
A01G 25/02 (2006.01)

(52) U.S. Cl.
CPC .................. A01G 25/026 (2013.01)

(58) Field of Classification Search
CPC .................................. A01G 25/026
USPC .......................... 29/798, 809, 237
See application file for complete search history.

(56) References Cited

U.S. PATENT DOCUMENTS

| 2,315,209 | A | | 3/1943 | Kost | |
|---|---|---|---|---|---|
| 3,526,944 | A | * | 9/1970 | Cherup | B25B 27/146 29/243.57 |
| 4,535,925 | A | * | 8/1985 | Ramey | B21J 15/323 29/811.2 |
| 4,769,891 | A | | 9/1988 | Corral | |
| 4,793,226 | A | | 12/1988 | Kress | |
| 5,177,846 | A | | 1/1993 | Bryant | |
| 5,324,379 | A | | 6/1994 | Eckstein | |
| 5,722,142 | A | | 3/1998 | Myers | |
| 5,893,201 | A | | 4/1999 | Myers | |
| 5,926,947 | A | * | 7/1999 | Takano | B23P 19/001 29/785 |
| 6,148,507 | A | * | 11/2000 | Swanson | B21J 15/105 29/811.2 |
| 6,343,616 | B1 | | 2/2002 | Houtchens | |
| 6,381,821 | B1 | * | 5/2002 | Panyon, Jr. | B25B 27/14 29/811.2 |
| 6,430,767 | B1 | | 8/2002 | Ramos | |
| 6,581,262 | B1 | | 6/2003 | Myers | |
| 6,901,643 | B1 | | 6/2005 | Krasner | |

(Continued)

FOREIGN PATENT DOCUMENTS

| AU | 2005202094 A1 | 12/2005 |
|---|---|---|
| FR | 2550722 A1 | 3/1989 |
| GB | 2154170 A1 | 9/1985 |

Primary Examiner — Christopher M Koehler
(74) Attorney, Agent, or Firm — TMB Law; Timothy M. Brown

(57) ABSTRACT

The invention provides a device and method for repeatedly installing drip irrigation emitters into drip irrigation tubing. The device can be provided with a magazine capable of holding a plurality of drip irrigation emitters. The magazine feeds individual drip irrigation emitters to a plunger and sleeve arrangement that cooperate to guide the drip irrigation emitters through the device's housing and into a section of drip irrigation tubing.

22 Claims, 20 Drawing Sheets

(56) References Cited

U.S. PATENT DOCUMENTS

| | | |
|---|---|---|
| 6,951,153 B2 | 10/2005 | Berthlaume |
| 7,185,409 B1 | 3/2007 | Myers |
| 8,850,933 B2 | 10/2014 | Amouroux |
| 8,898,876 B2 | 12/2014 | Feith |
| 10,071,449 B1 | 9/2018 | Donofrio |
| 10,391,512 B1* | 8/2019 | Samuel .................. B05B 1/202 |
| 10,420,293 B2 | 9/2019 | Zakarian |
| 11,370,087 B2 | 6/2022 | Birkeland |
| 2005/0060864 A1* | 3/2005 | Nikolaidis ............. B25B 27/10 29/432 |
| 2006/0248702 A1 | 11/2006 | Nikolaidis |
| 2011/0016682 A1 | 1/2011 | Wood |
| 2012/0248759 A1 | 10/2012 | Feith |
| 2015/0336224 A1* | 11/2015 | Liu ........................ B25B 23/04 29/809 |
| 2018/0338434 A1* | 11/2018 | Wlassich ............. A01G 25/023 |

* cited by examiner

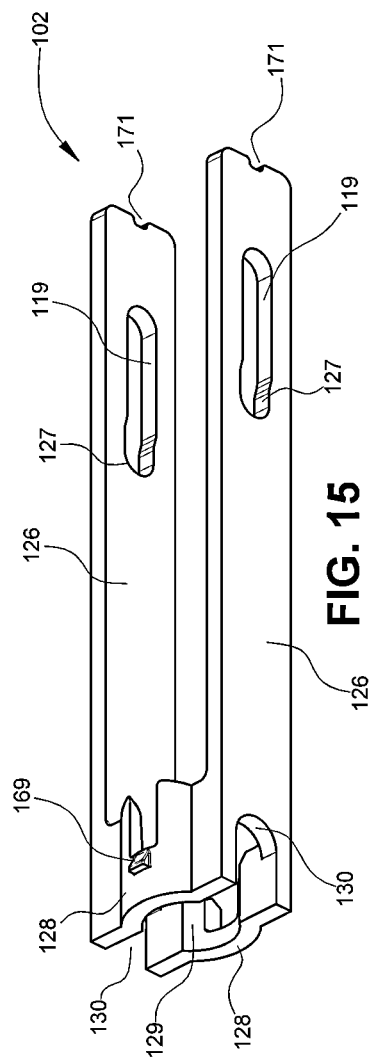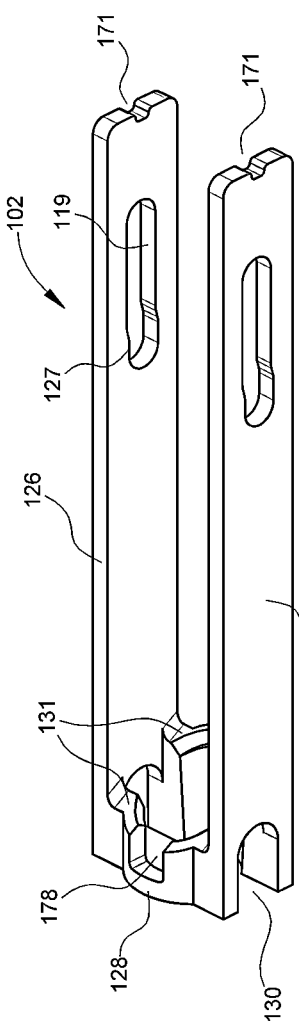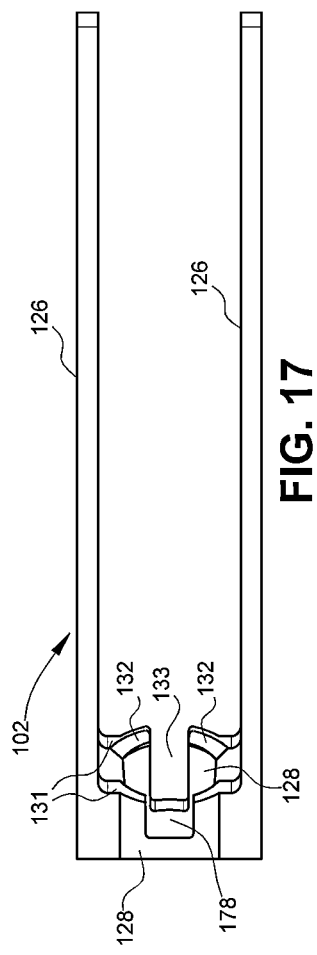

DEVICE AND METHOD FOR REPEATEDLY INSTALLING DRIP IRRIGATION EMITTERS

CROSS-REFERENCE TO RELATED APPLICATIONS

This application claims the benefit of provisional application No. 63/437,719 filed Jan. 8, 2023, the entire contents of which are incorporated herein by reference for all purposes.

FIELD OF THE INVENTION

The invention generally relates to drip irrigation. More particularly, the invention relates to devices and methods for installing drip irrigation emitters.

BACKGROUND

Drip irrigation emitters provide an efficient means for irrigating a wide variety of crops. These emitters conserve water as their delivery of water is restricted to root zones where water is required for crop growth and maintenance. Large crop fields that are irrigated by drip irrigation emitters require an immense number of emitters. Drip irrigation emitters are currently installed by a user creating a hole in drip irrigation tubing, and manually pressing a barbed inlet on the drip irrigation emitter into the hole in the tubing. Other means for installing drip irrigation emitters include handheld tools which are manually loaded with a single drip irrigation emitter which is then pressed into drip irrigation tubing using the tool. Thus, current means for installing drip irrigation are inefficient as they require a series of steps and install only a single drip irrigation emitter. This inefficiency can be profound in commercial farming operations where large crop fields require the installation of thousands of drip irrigation emitters.

What is needed in the art therefore is a device and method for quickly and efficiently installing drip irrigation emitters.

SUMMARY OF THE INVENTION

The invention provides a device and method for repeatedly installing drip irrigation emitters. The inventive device includes a removable magazine for housing a plurality of drip irrigation emitters. The magazine feeds the emitters to a plunger which drives the emitters into a section of drip irrigation tubing under the guidance of a sleeve that is in slidable arrangement with the plunger. With the drip irrigation emitter installed in the section of tubing, the plunger and sleeve retract within the device such that the magazine feeds a subsequent emitter into position to be driven into another section of drip irrigation tubing under the force of the plunger and guidance of the sleeve.

BRIEF DESCRIPTION OF THE DRAWINGS

FIG. 15 shows a front, bottom perspective view of a sleeve for use with the invention.

FIG. 16 shows a rear, top perspective view of a sleeve for use with the invention.

FIG. 17 shows a plan view of a sleeve for use with the invention.

Figure 1:
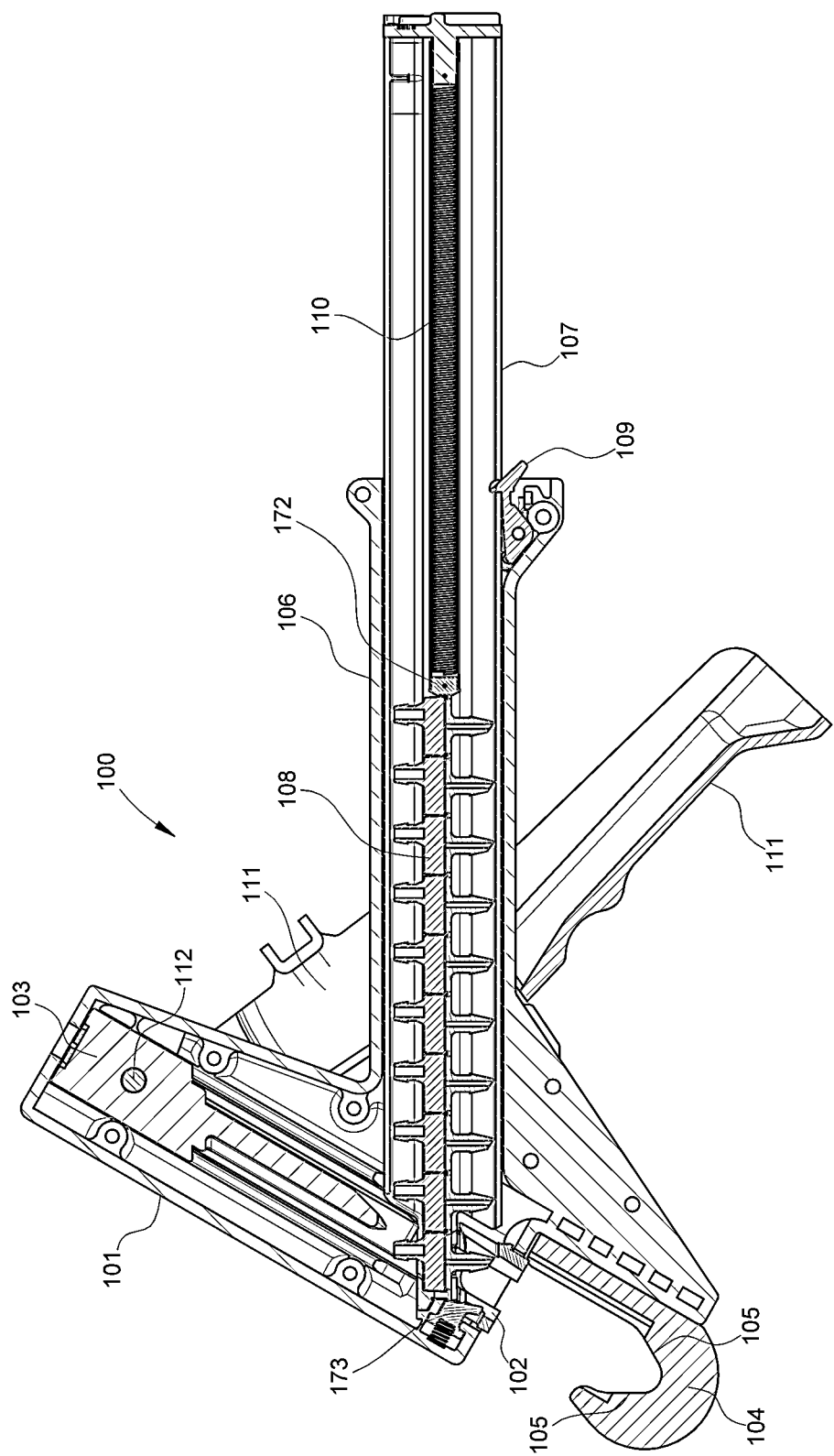
FIG. 1 shows a cross-sectional view of an embodiment of the inventive device.

The figures referred to above are not drawn necessarily to scale and should be understood to present a representation of the invention, illustrative of the principles involved. Some features of the device and components depicted in the drawings have been enlarged or distorted relative to others to facilitate explanation and understanding. The same reference numbers are used in the drawings for similar or identical components and features shown in various alternative embodiments. The device and components, as disclosed herein, will have configurations determined, in part, by the intended application and environment in which the inventive device is used.

DETAILED DESCRIPTION

The invention provides a device and method for repeatedly installing drip irrigation emitters. The device comprises a plunger, sleeve, and magazine adapted to contain a plurality of drip irrigation emitters. Drip irrigation emitters are fed from the magazine to the sleeve which holds the drip irrigation emitter in a stable orientation which enables the plunger to drive the emitter through the body of the device towards the end of the device where the emitter is driven into a section of drip irrigation tubing.

FIG. 1 shows a cross-sectional view of an embodiment of the inventive device in a resting state. Device 100 includes housing 101 having sleeve 102 slidably disposed within housing 101, with plunger 103 being slidably disposed within sleeve 102. Device 100 includes cradle 104 coupled to an end of housing 101. Cradle 104 has a configuration that is adapted to receive a section of drip irrigation tubing. The cradle configuration is suitable for receiving and holding a section of drip irrigation tubing in a stable, rigid orientation such that the inlet of a drip irrigation emitter can be driven into the section of tubing by plunger 103 without the section of tubing collapsing inward upon itself.

Cradle 104 can assume a configuration wherein opposing cradle sides 105 are at an acute angle with respect to one another. As shown in FIG. 1, cradle 104 can have an elliptical bottom portion. However, it will be appreciated that cradle 104 can assume other shapes. For example, the bottom of cradle 104 can assume a shape wherein cradle sides 105 form an acute angle wherein the bottom of cradle 104 forms a vertex where cradle sides 105 converge. It will also be appreciated that cradle 104 can assume a shape wherein cradle sides 105 and the bottom of cradle 104 form a hemisphere.

The device includes handle 106 which is adapted to receive magazine 107, while magazine 107 is adapted to receive a plurality of drip irrigation emitters 108. Magazine 107 can have a capacity of up to five, up to 10, up to 15, or more drip irrigation emitters. Handle 106 is pivotably connected to magazine latch 109 which is adapted to retain magazine 107 within handle 106 by interacting with latch notch 150 in the body of magazine 107. Magazine 107 includes telescoping magazine rod 110 internally within magazine 107 wherein telescoping magazine rod 110 terminates in magazine follower 172 which is adapted to contact the lowermost drip irrigation emitter within magazine 107. Telescoping magazine rod 110 is removable from magazine 107 and can comprise a pair of rigid, elongate bodies wherein a first elongate body slides within the lumen of a second elongate body such that the magazine rod is permitted to collapse upon itself. The first elongate body and second elongate body are in mechanical communication with, and enshroud, magazine spring 175 which is compressed when the first elongate body slides into the lumen of the second elongate body. Compression of magazine spring 175 provides force to magazine follower 172 such that magazine follower 172 maintains contact with the lowermost drip irrigation emitter within magazine 107 thereby forcing the advance of emitters housed within the magazine towards sleeve 102.

The external surface of handle 106 is pivotably connected to trigger 111 so as to permit trigger 111 to function as a fulcrum for driving sleeve 102 and plunger 103 towards cradle 104 when trigger 111 is compressed by a user's hand towards handle 106. Trigger 111 is maintained in mechanical connection with plunger 103 by plunger pin 112. FIG. 1 shows the device in a resting state wherein trigger 111 is held in an open position under the tension of springs 120 which are coupled to handle 106 and trigger 111. In an active state, trigger 111 is compressed towards handle 106 thereby compressing the springs and moving plunger 103 through sleeve 102 towards cradle 104 causing plunger 103 to contact a drip irrigation emitter housed within the end of magazine 107. Continued compression of trigger 111 causes plunger 103 to continue its advance through sleeve 102 such that the drip irrigation emitter rotates within the end of magazine 107 and becomes flush with the end of plunger 103 as the emitter begins to exit the end of magazine 107.

As the drip irrigation emitter leaves the end of magazine 107, the sides of the emitter are aligned with the internal sides of sleeve 102. This orientation permits the emitter to slidably travel into sleeve 102 under the force of plunger 103 without the emitter wobbling or binding. Continued compression of trigger 111 causes plunger 103 to continue its travel through sleeve 102, and the end of magazine 107, whereupon plunger pin 112 contacts the forward end of sleeve slots 119 within sleeve 102 leading plunger 103, sleeve 102 and the drip irrigation emitter retained within sleeve 102 to travel together through housing 101 towards cradle 104. This arrangement stabilizes the emitter within sleeve 102 so that the inlet of the emitter can be driven into a section of drip irrigation tubing within cradle 104 without the emitter tilting or wobbling out of its alignment with plunger 103.

Figure 2:
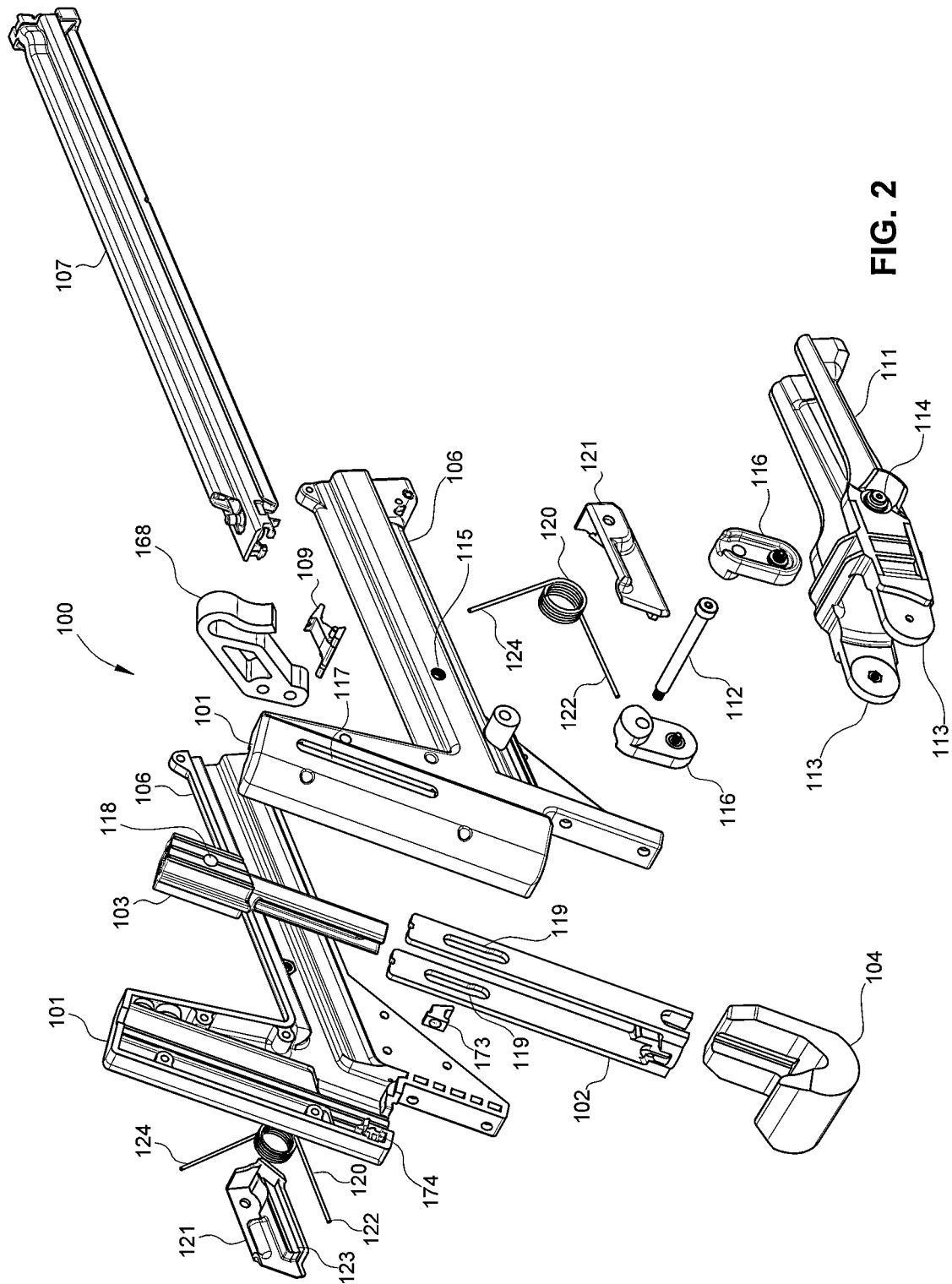
FIG. 2 shows an exploded view of an embodiment of the inventive device.

FIG. 2 shows an exploded view of device 100 depicting housing 101, sleeve 102, plunger 103, cradle 104, handle 106, magazine 107, magazine latch 109, and trigger 111. Trigger 111 features a pair of opposing trigger ears 113 which straddle the outside of housing 101 in the device's assembled state. Trigger 111 is pivotably connected to handle 106 by a pair of opposing trigger screws 114 which thread into trigger screw threads 115 on handle 106. Trigger 111 is mechanically connected to plunger 103 through a pair of opposing linking bodies 116 which are pivotably connected to trigger ears 113, such as by screws. Linking bodies 116 are in pivotable, mechanical communication with plunger 103 through plunger pin 112 which traverses housing 101 through a pair of opposing housing slots 117 which traverse the opposing sides of housing 101. In the device's assembled state, plunger 103 is slidably disposed within sleeve 102 which is slidably disposed within housing 101, while plunger pin 112 traverses housing slots 117, sleeve slots 119, and plunger pin opening 118 so as to place trigger 111 in mechanical communication with plunger 103 and sleeve 102.

Trigger 111 is maintained in an open position in the device's resting state through tension provided by a pair of opposing springs 120 which are disposed outside of housing 101 in the device's assembled state. Springs 120 are coupled to trigger 111 through a pair of opposing spring mounts 121 which are adapted to receive springs 120 wherein spring ends 122 nest against receiving portions 123 within spring mounts 121. Springs ends 124 rest against the surface of handle 106 when the device is in its assembled state. In the device's assembled state, springs 120 are disposed between the inner surfaces of spring mounts 121 and the outside of housing 101, while spring mounts 121 are disposed between the inside surfaces of linking bodies 116 and the outside surface of housing 101. Linking bodies 116, in turn, are disposed on the outside surface of trigger ears 113 on trigger 111 with the inner surface of linking bodies 116 being in contact with the outer surface of spring mounts 121. Device 100 can include clip 168 connected to housing 101 so as to permit the device to be detachably connected to an object, such as the belt or pocket of a user.

Still referring to FIG. 2, device 100 can further include ejector 173. Ejector 173 nests inside ejector mount 174 in housing 101. Ejector mount 174 forms a recess in housing 101 and is adapted to receive the profile of ejector 173. Ejector 173 is adapted to eject a drip irrigation emitter from sleeve 102 when the sleeve retracts within housing 101 while retaining an emitter that was not driven into a section of drip irrigation tubing under the force of plunger 103. Thus, ejector 173 is adapted to prevent uninstalled emitters from binding against the top emitter housed within magazine 107 when the device returns to its resting state.

Figure 3:
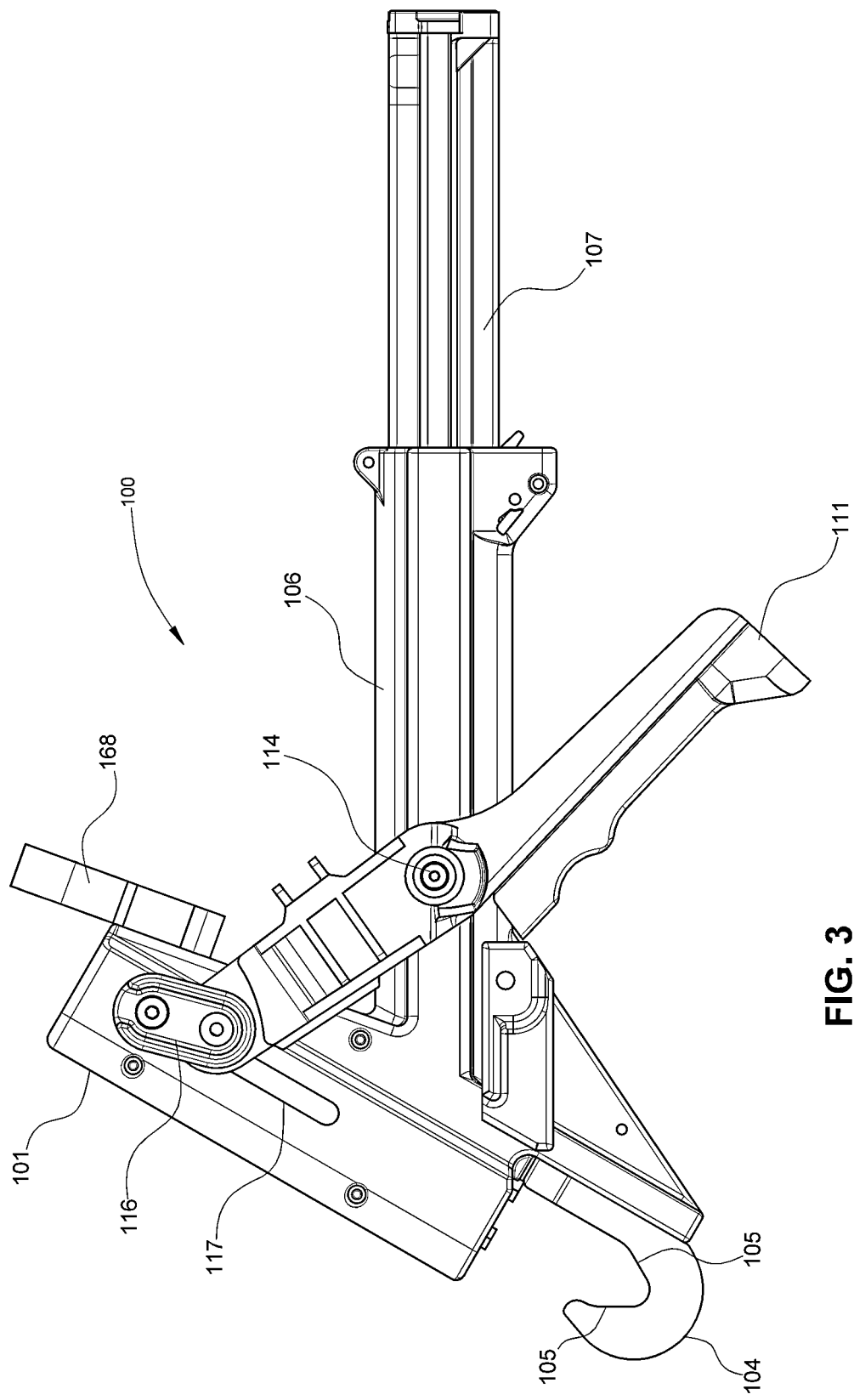
FIG. 3 shows a side view of an embodiment of the inventive device in an assembled, resting state.

FIG. 3 shows an embodiment of device 100 in an assembled state wherein housing 101 is coupled to handle 106 and cradle 104. Handle 106 is pivotably connected to trigger 111 by trigger screws 114. Trigger 111 is pivotally connected to linking bodies 116, while clip 168 is coupled to housing 101. Magazine 107 is shown installed within handle 106. FIG. 3 shows the device in its resting state with trigger 111 fully extended away from handle 106.

Figure 4:
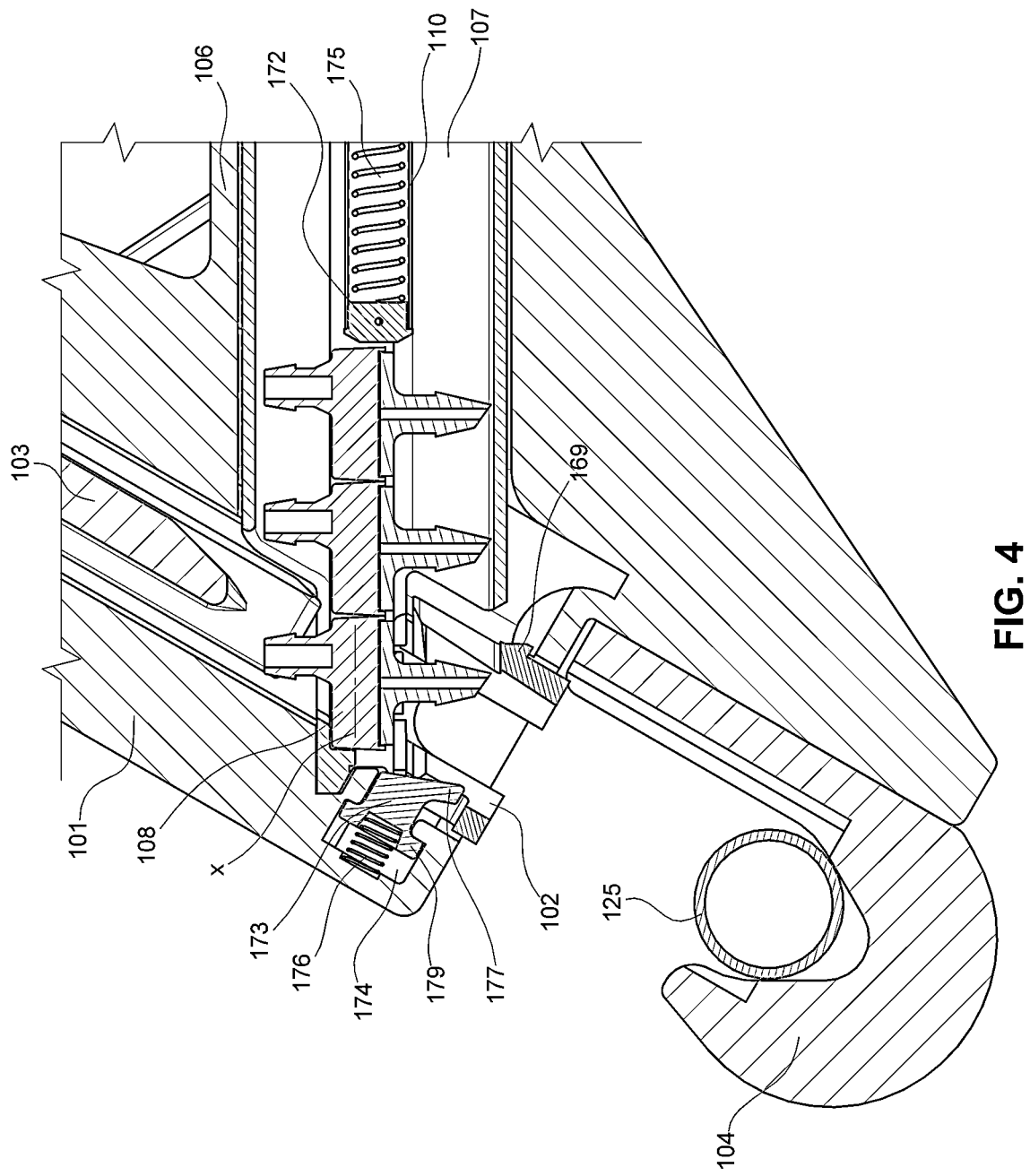
FIG. 4 shows a cross-sectional view of the forward end of an embodiment of the inventive device in a resting state.

FIG. 4 shows a cross-sectional view of the forward end of device 100 in a resting state wherein magazine 107 is installed within handle 106 such that the upper end of magazine 107 is disposed within sleeve 102. Uppermost drip irrigation emitter 108 is held in place in an aperture in the end of magazine 107 by magazine follower 172 on the end of telescoping magazine rod 110 with magazine follower 172 providing upward force against the bottom emitter in magazine 107. Plunger 103 and sleeve 102 remain in a retracted state under the tension of springs 120. In the device's resting state, plunger 103 preferably does not contact drip irrigation emitter 108 and the rearward end of plunger 103 contacts the inside rear surface of housing 101. Drip irrigation emitter 108 is housed within the end of magazine 107 such that the lower surface of the emitter having the barbed inlet is orientated towards the forward end of the device where cradle 104 is located, while the upper surface of the emitter with the spout is oriented towards plunger 103.

In the device's resting state, horizontal axis X of drip irrigation emitter 108 is oriented at an angle with respect to the surface of the end of plunger 103. Sleeve 102 includes extension 169 on the lower surface of the sleeve. Extension 169 contacts the inside surface of housing 101 so as to produce friction between sleeve 102 and housing 101 thereby maintaining sleeve 102 in a stable position for receiving drip irrigation emitter 108 under the force of plunger 103. That is, extension 169 prevents the forward motion of sleeve 102 as a drip irrigation emitter is pressed into the end of sleeve 102 under the force of plunger 103. The inside surface of housing 101 can incorporate a mating extension that is adapted to interface with extension 169 to create a point of contact for producing friction between housing 101 and extension 169.

While device 100 is depicted with handle 106 coupled to housing 101 at an angle, it will be appreciated that the invention can be practiced with the device wherein handle 106 is coupled to housing 101 at a 90-degree angle such that the longitudinal axis of handle 106 and the longitudinal axis of housing 101 are perpendicular to one another. In such an arrangement, the compression of trigger 111 will cause plunger 103 to come into contact with drip irrigation emitter 108 such that the upper surface of the emitter is flush with the end of plunger 103. That is, horizontal axis X of drip irrigation emitter 108 will be parallel to the end surface of plunger 103 when the device is in its resting state.

Figure 5:
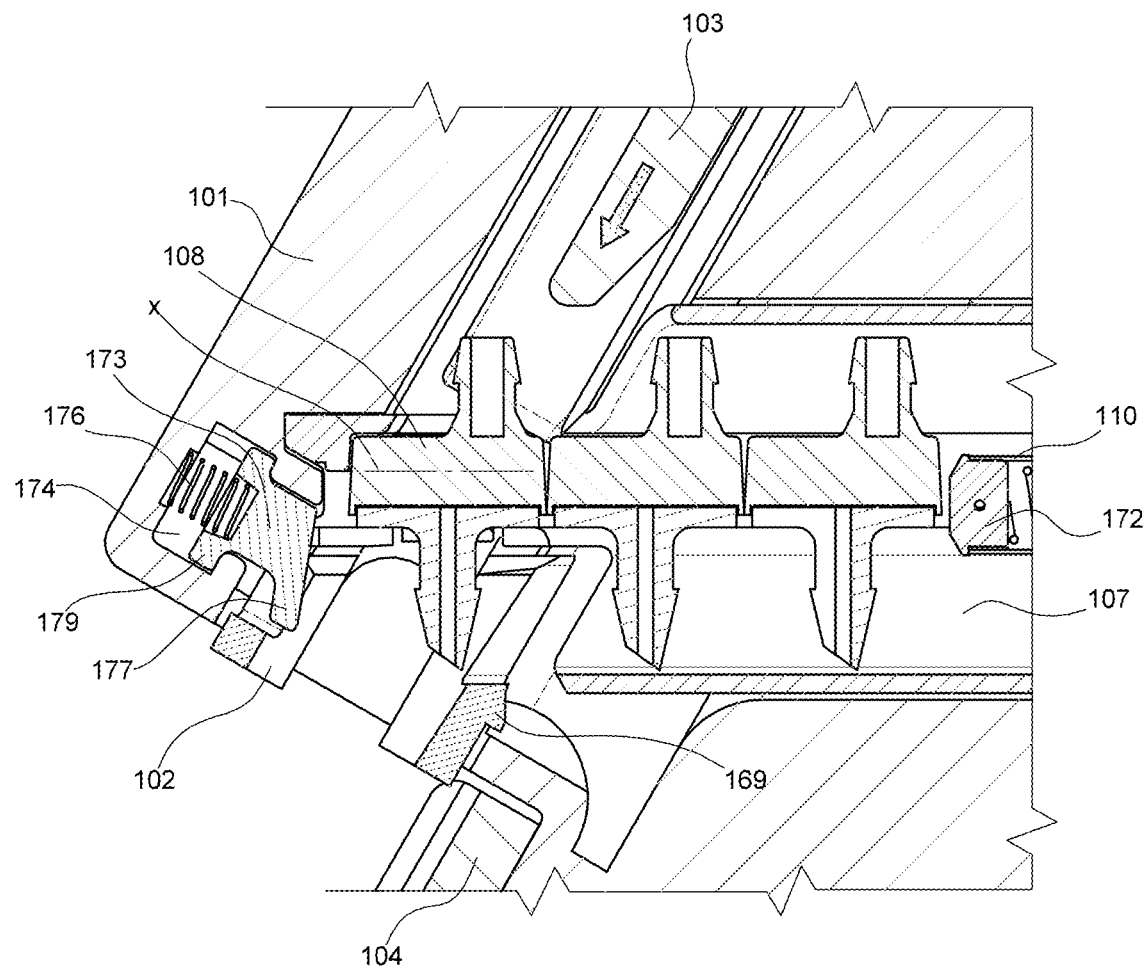
FIG. 5 shows a cross-sectional view of the forward end of an embodiment of the inventive device in a first activation state.

FIG. 5 shows a cross-sectional view of the forward end of device 100 in a first activation state wherein compressing trigger 111 towards handle 106 causes plunger 103 to travel through sleeve 102 towards cradle 104 such that the lower surface of the forward end of plunger 103 contacts the upper surface of drip irrigation emitter 108 while the emitter remains housed within an aperture in the end of magazine 107 and sleeve 102 remains stationary within housing 101. In this first activation state, horizontal axis X of drip irrigation emitter 108 remains at an angle with respect to the surface of the forward end of plunger 103.

Figure 6:
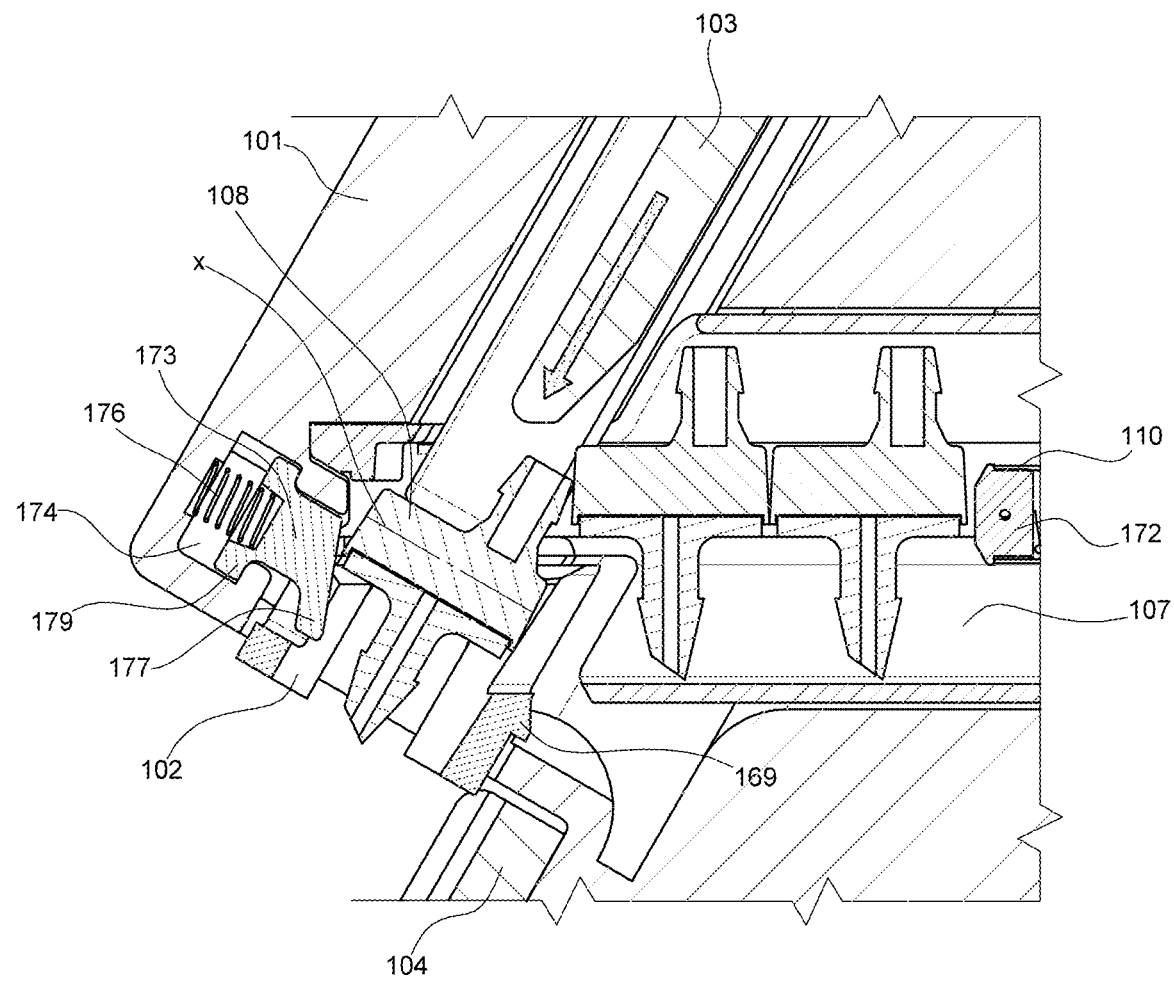
FIG. 6 shows a cross-sectional view of the forward end of an embodiment of the inventive device in a second activation state.

FIG. 6 shows a cross-sectional view of the forward end of device 100 in a second activation state wherein trigger 111 is further compressed towards handle 106 causing plunger 103 to further advance through sleeve 102 and through an aperture in the end of magazine 107 causing drip irrigation emitter 108 to rotate within the aperture in the end of magazine 107 such that horizontal axis X of the emitter assumes a position that is parallel to the surface of the end of plunger 103 as drip irrigation emitter 108 travels from the aperture in the end of magazine 107 towards cradle 104 under the force of plunger 103. As drip irrigation emitter 108 travels from the aperture in the end of magazine 107, the lower side surface of the emitter contacts the lower inner surface of sleeve 102 such that the lower surface of the emitter becomes aligned with the lower inner surface of sleeve 102. Meanwhile, extension 169 on the outer lower surface of sleeve 102 prevents the forward movement of plunger 103 from forcing sleeve 102 towards cradle 104 during the loading of drip irrigation emitter 108 into sleeve 102 as friction between extension 169 and the inside surface of housing 101 maintains sleeve 102 in its retracted state.

Figure 7:
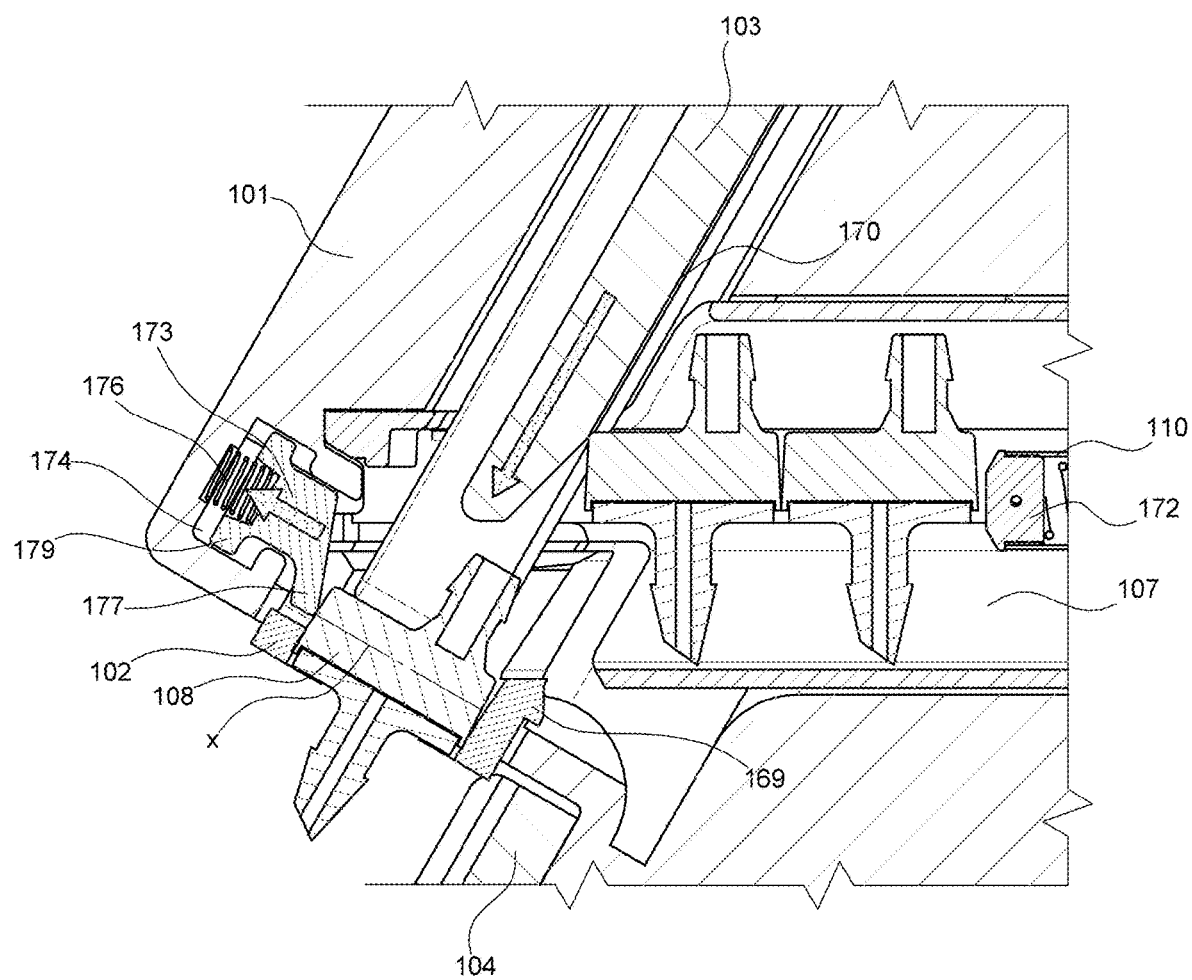
FIG. 7 shows a cross-sectional view of the forward end of an embodiment of the inventive device in a third activation state.

FIG. 7 shows the device in a third activation state wherein continued compression of trigger 111 causes drip irrigation emitter 108 to leave the aperture in the end of magazine 107 such that upper side of drip irrigation emitter 108 contacts the lower biased surface of ejector 173. Under the force of plunger 103, drip irrigation emitter 108 slides against the lower biased surface of ejector 173 causing ejector 173 to ascend into ejector mount 174 thereby compressing ejector spring 176. As the upper side of drip irrigation emitter 108 clears ejector shoe 177, the upper side of the emitter contacts the upper inner surface of sleeve 102 such that the sides of the emitter become fully aligned with the inner surfaces of sleeve 102 such that the emitter is retained within the end of sleeve 102 under friction. In this third activation state, plunger pin 112 contacts the forward end of sleeve slots 119 within sleeve 102 such that continued compression of trigger 111 causes sleeve 102 to advance together with plunger 103 and retained drip irrigation emitter 108 through housing 101 towards cradle 104.

Figure 8:
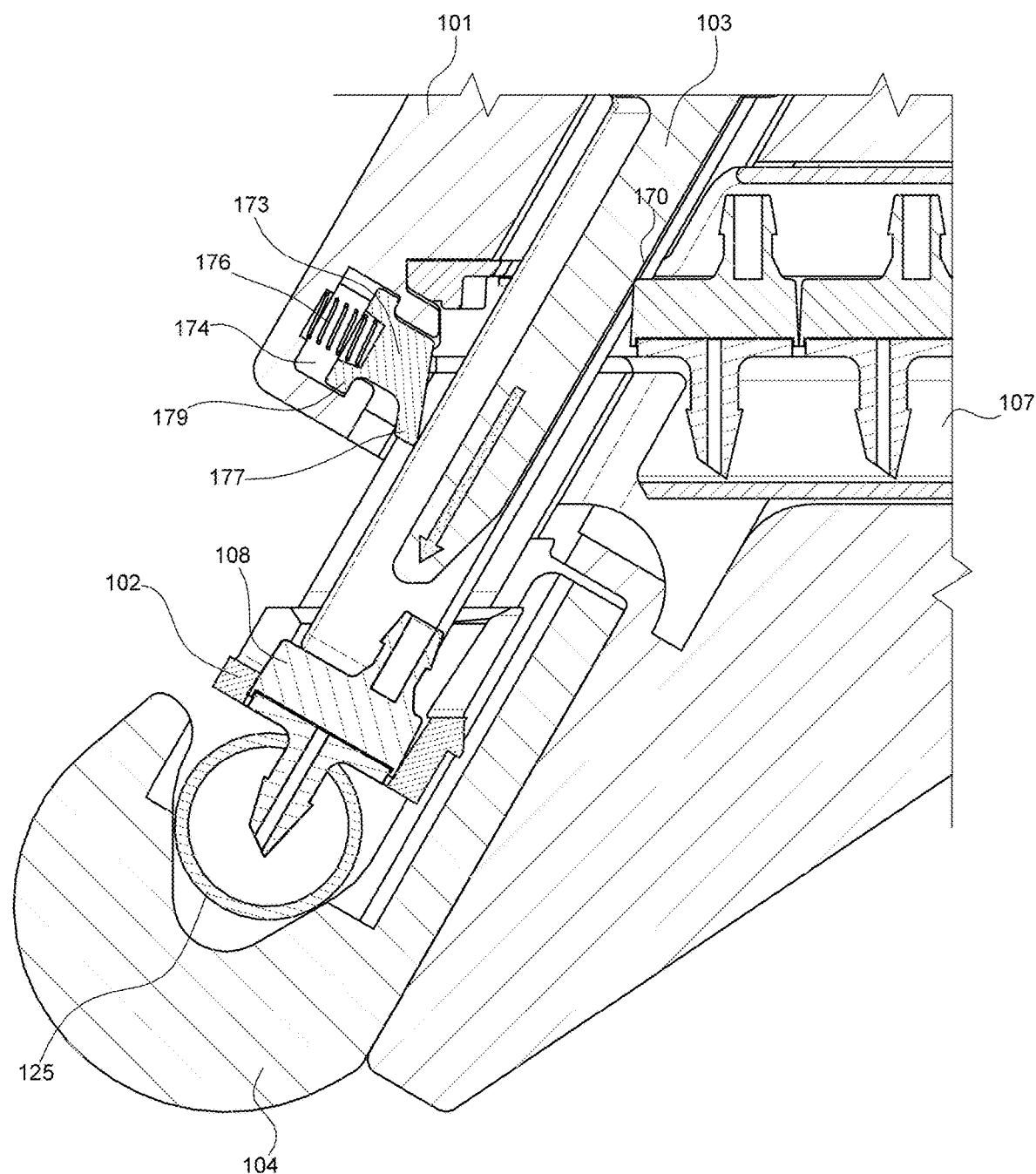
FIG. 8 shows a cross-sectional view of the forward end of an embodiment of the inventive device in a fourth activation state.

FIG. 8 shows the device in a fourth activation state wherein continued compression of trigger 111 causes sleeve 102, plunger 103, and retained drip irrigation emitter 108 to continue their travel together towards cradle 104 such that the forward ends of sleeve 102 and plunger 103 exit housing 101 to drive the barb of retained drip irrigation emitter 108 into section of drip irrigation tubing 125 under the force of plunger 103 thereby installing the emitter within the section of drip irrigation tubing.

In this fourth activation state, the upper side of drip irrigation emitter 108 has cleared ejector shoe 177 such that ejector 173 has descended within ejector mount 174 under the force of ejector spring 176. In this extended state, ejector shoe 177 can be slidably engaged with the upper surface of plunger 103. Alternatively, ejector 173 can be held in an extended state by ejector shoulders 179 which contact the inside, lower surfaces of ejector mount 174 under the force of ejector spring 176 such that ejector shoe 177 remains suspended above the upper surface of plunger 103. In its extended state, ejector 173 is in a loaded position that permits ejector 173 to eject a retained emitter from sleeve 102 in instances where sleeve 102 retracts into housing 101 without having installed the emitter into section of drip irrigation tubing 125. By so ejecting uninstalled emitters from sleeve 102, ejector 173 prevents uninstalled emitters from binding against the top emitter housed within magazine 107 thereby preventing the jamming of the device when sleeve 102 returns to the resting state as disclosed herein.

Figure 9:
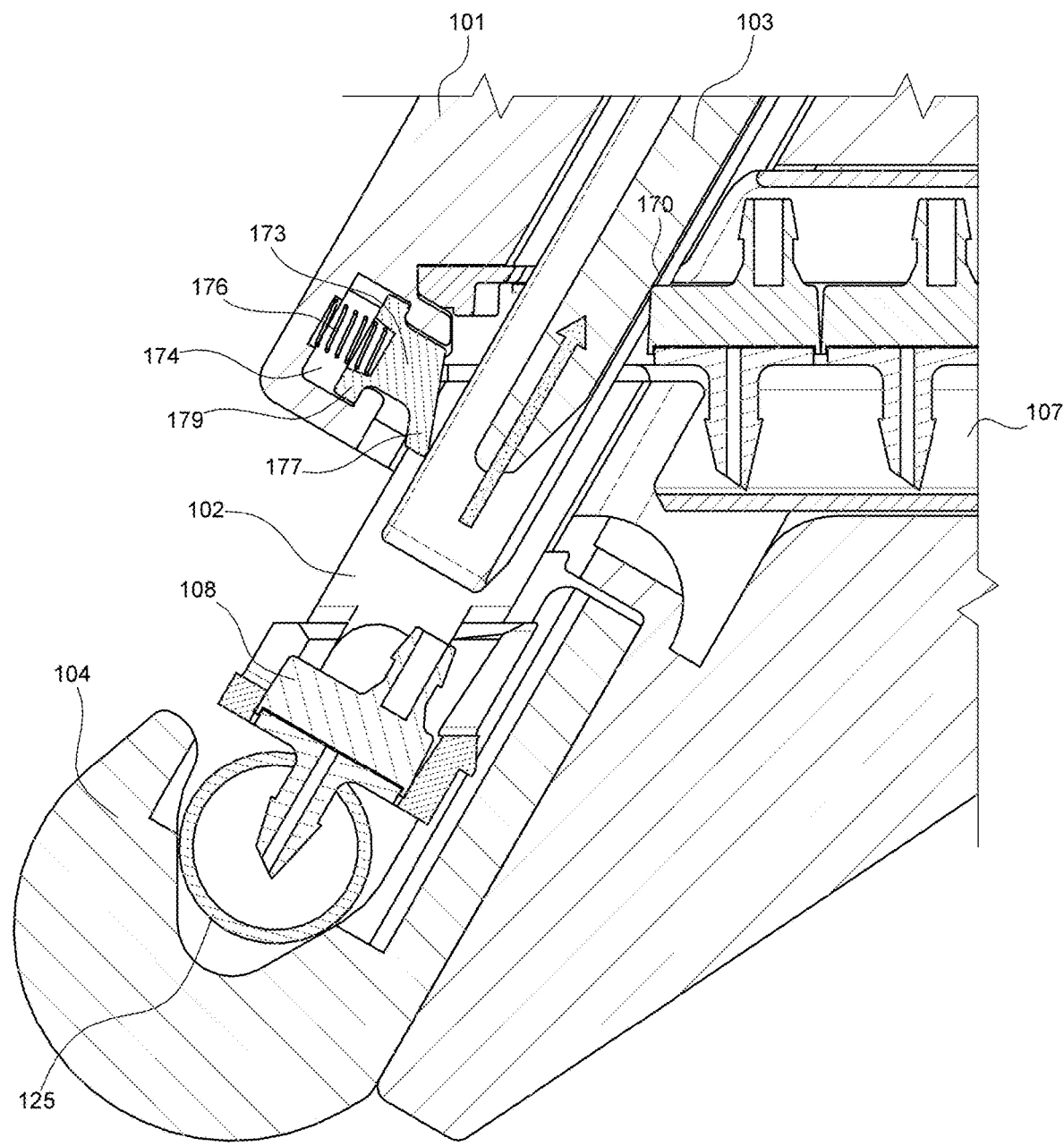
FIG. 9 shows a cross-sectional view of the forward end of an embodiment of the inventive device in a first retraction state.

FIG. 9 shows the device in a first retraction state wherein relaxation of the user's grip on trigger 111 causes plunger 103 to retract within sleeve 102 and away from drip irrigation emitter 108 under the force of springs 120 which were loaded by the compression of trigger 111. In this first retraction state, sleeve 102 remains extended towards cradle 104, with the emitter remaining retained within the end of sleeve 102. Sleeve 102 is permitted to remain extended without retracting with plunger 103 due to friction between the outside surfaces of the installed drip irrigation emitter and the inner surfaces of sleeve 102 as the emitter is held firmly within section of drip irrigation tubing 125 by the emitter inlet's barb. Sleeve 102 is permitted to remain in this extended state as plunger pin 112 is traveling freely through sleeve slots 119 within sleeve 102 as plunger 103 travels towards the rear of the device.

Figure 10:
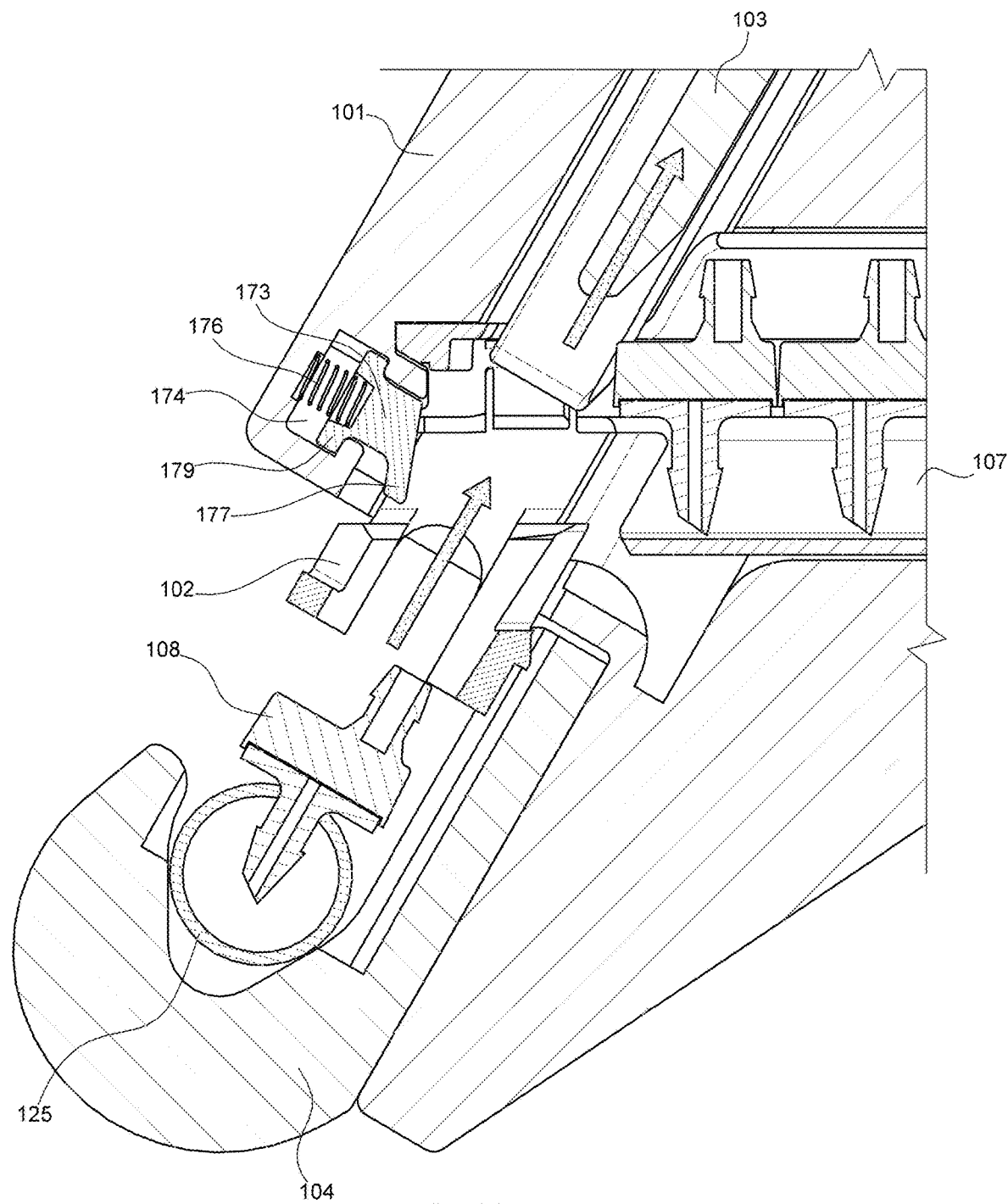
FIG. 10 shows a cross-sectional view of the forward end of an embodiment of the inventive device in a second retraction state.

FIG. 10 shows the device in a second retraction state wherein continued relaxation of the user's grip on trigger 111 causes plunger 103 and plunger pin 112 to move towards the rear of the device under the force of springs 120 such that plunger pin 112 contacts the rear end of sleeve slots 119 causing sleeve 102 to slidably retract together with plunger 103 towards the rear of the device such that sleeve 102 withdraws from drip irrigation emitter 108 which remains installed within section of drip irrigation tubing 125 due to friction provided by the barbed spout of the emitter.

Figure 11:
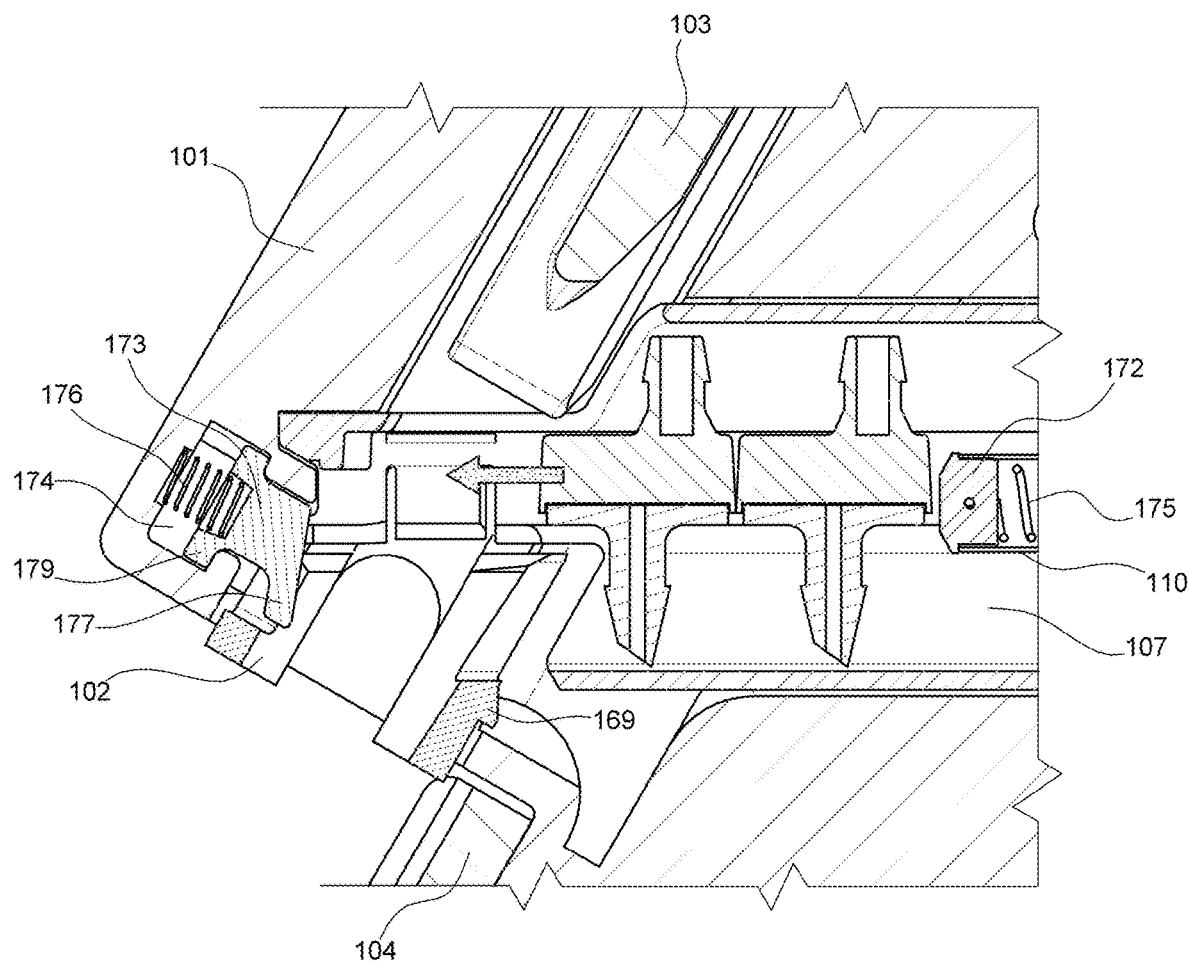
FIG. 11 shows a cross-sectional view of the forward end of an embodiment of the inventive device in a third retraction state.

FIG. 11 shows the device in a third retraction state wherein continued relaxation of the user's grip on trigger 111 causes plunger 103 and sleeve 102 to further retract together towards the rear of the device such that plunger 103 clears the aperture in the end of magazine 107 and the rearward end of sleeve 102 contacts the inside surface of housing 101 to allow a subsequent irrigation emitter to become nested within the aperture in the end of magazine 107 under the force of telescoping magazine rod 110. Thus, the third retraction state enables the device to return to its resting state such that the device is ready to install a subsequent drip irrigation emitter. In the device's resting state, ejector 173 is in an extended state and ejector shoe 177 occupies ejector port 178 in sleeve 102 while ejector shoulders 179 are in contact with the inside surfaces of ejector mount 174.

Figure 12:
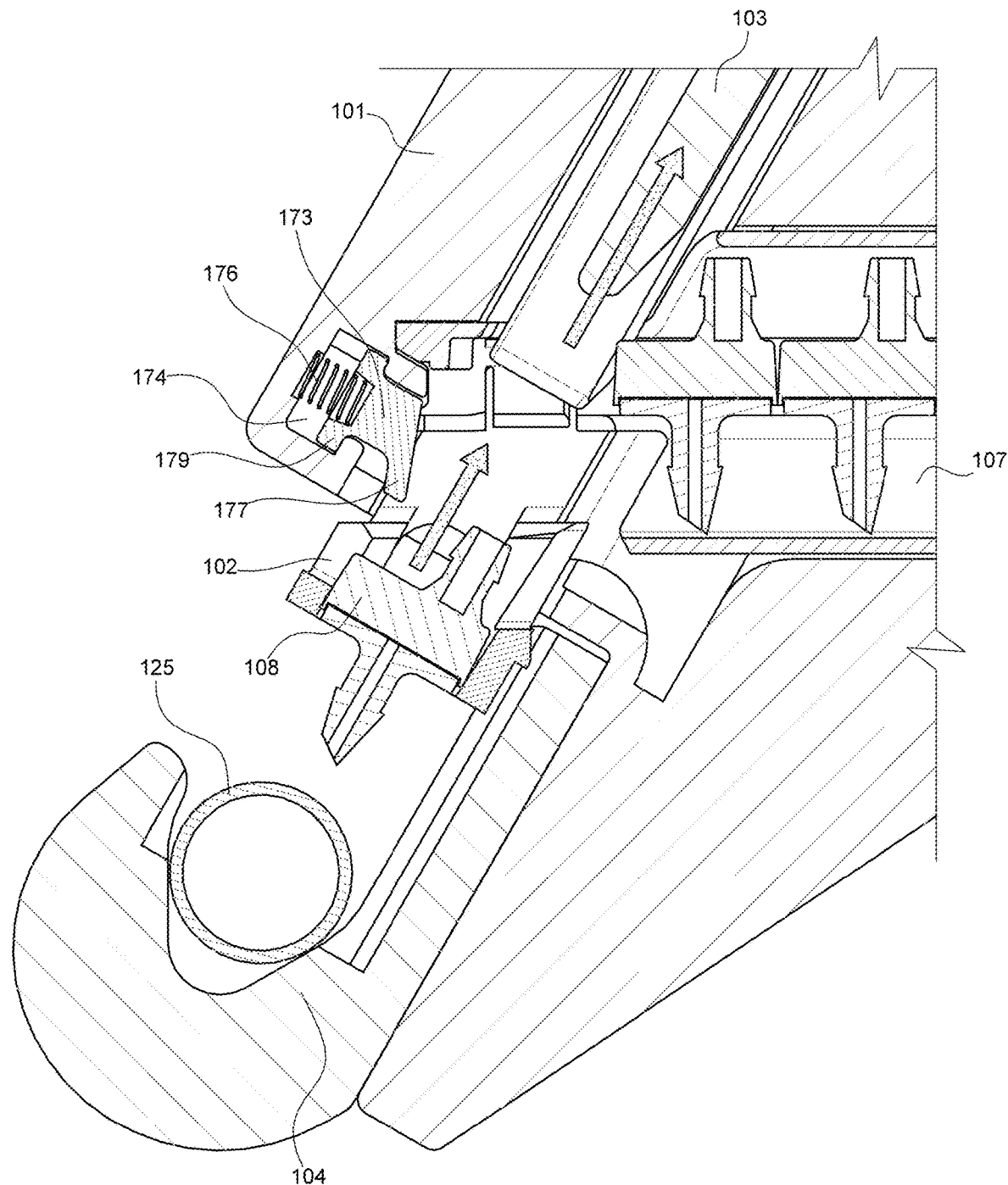
FIG. 12 shows a cross-sectional view of the forward end of an embodiment of the inventive device in a first ejection state.

FIG. 12 shows the device in a first ejection state wherein sleeve 102 begins its rearward travel within housing 101 while drip irrigation emitter 108 remains retained in the forward end of sleeve 102 due to friction forces between the sides of the emitter and the inner surfaces of sleeve 102. This situation can arise when the tool assumes the configuration of the fourth activation state disclosed herein without the drip irrigation emitter having been installed, and held within, a section of drip irrigation tubing. For example, the device may have been placed into the fourth activation state without a section of drip irrigation tubing having been placed within cradle 104. Alternatively, the situation of an uninstalled, retained emitter can arise due to a partial stroke of trigger 111, or the failure of the emitter inlet's barb to retain the inlet within a section of drip irrigation tubing after the inlet pierces the wall of the section of drip irrigation tubing. Ejector 173 is shown in an extended, loaded position in FIG. 12.

Figure 13:
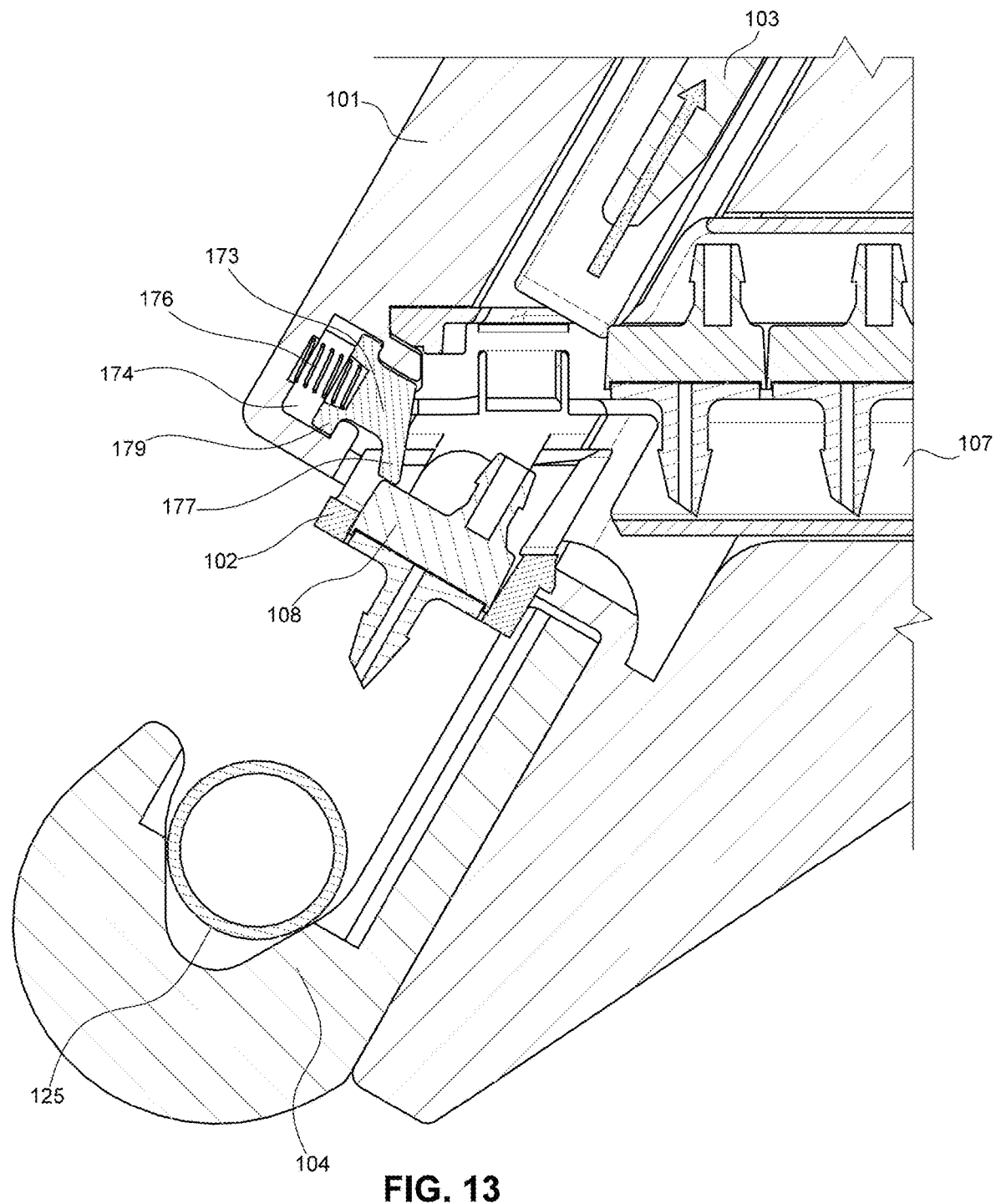
FIG. 13 shows a cross-sectional view of the forward end of an embodiment of the inventive device in a second ejection state.
Figure 14:
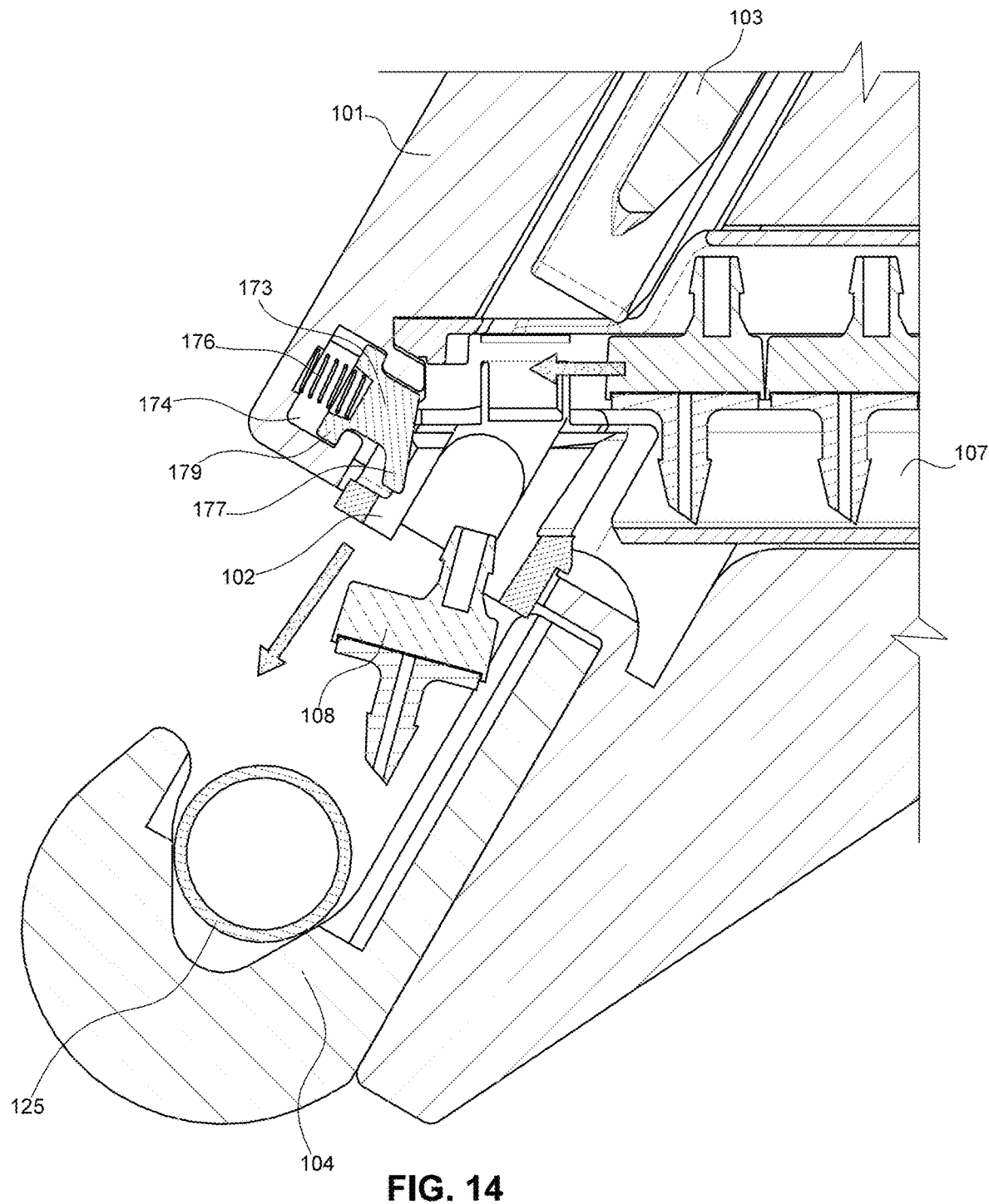
FIG. 14 shows a cross-sectional view of the forward end of an embodiment of the inventive device in a third ejection state.

FIG. 13 shows the device in a second ejection state wherein plunger 103 continues its rearward travel with drip irrigation emitter 108 retained within the forward end of sleeve 102 until ejector shoe 177 contacts the upper surface of the emitter. In this configuration, ejector 173 is in its extended state and ejector shoe 177 is permitted to contact the emitter through ejector port 178 which enables ejector shoe 177 to traverse the upper side of sleeve 102. FIG. 14 shows the device in a third ejection state wherein continued rearward travel of plunger 103 under the force of springs 120 overcomes the friction force between the sides of the retained drip irrigation emitter and the inner surfaces of sleeve 102 such that the retained emitter is pushed out of the forward end of sleeve 102.

FIGS. 15 and 16 show a non-limiting embodiment of sleeve 102. In this embodiment, sleeve 102 includes a pair of opposing sleeve arms 126 having sleeve slots 119 which create openings that traverse sleeve arms 126. The length of sleeve slots 119 determines the distance of the lag between the forward and rearward movement of plunger 103 relative to sleeve 102 during the activation and retraction states disclosed herein. This function is accomplished by the mechanical communication provided by the connection of plunger 103 and sleeve 102 to trigger 111 through plunger pin 112, linking bodies 116, and trigger ears 113. Compression of trigger 111 translates this force to the forward movement of plunger 103 within sleeve 102 towards cradle 104 in a linear relationship without lag. Continued compression of trigger 111 causes plunger 103 to continue its advance towards cradle 104 without the movement of sleeve 102 as plunger pin 112 travels freely through sleeve slots 119. When plunger pin 112 contacts the forward end of sleeve slots 119, continued compression of trigger 111 causes sleeve 102 to advance forward towards cradle 104 such that plunger 103 and sleeve 102 advance together towards cradle 104. Sleeve slots 119 can include sleeve slot offsets 127 such that a portion of sleeve slots 119 form a trough beneath the horizontal axis of sleeve slots 119. Sleeve slot offsets 127 function to force sleeve 102 upward when plunger pin 112 contacts the forward end of sleeve slots 119 thereby relieving the friction between extension 169 on sleeve 102 and the inside surface of housing 101 to permit sleeve 102 to travel freely through housing 101.

Sleeve arms 126 are joined to one another at the forward end of sleeve 102. In some embodiments, sleeve arms 126 are joined to one another by a pair of opposing end portions 128. End portions 128 form aperture 129 having a dimension suitable for receiving the body of a drip irrigation emitter. In some embodiments, aperture 129 has a dimension that is sufficient to create tension between the inner walls of aperture 129 and the body of a drip irrigation emitter nested within aperture 129 such that the emitter nests within aperture 129 under friction. In some embodiments, this tension is created by sleeve gaps 130 which permit end portions 128 to flex and separate from one another when a drip irrigation emitter becomes retained within aperture 129 under the force of plunger 103. Aperture 129 can assume an annular shape that mates with the outer circumference of the body of a drip irrigation emitter. Aperture 129 can have a draft angle wherein the opening of aperture 129 that faces the rear of sleeve 102 is the same or greater than the diameter of a body of a drip irrigation emitter, and the opposing opening of aperture 129 that faces the front of sleeve 102 has a diameter that is less than the diameter of the body of the drip irrigation emitter. The lower surface of lower end portion 128 includes extension 169 which is adapted to create friction between sleeve 102 and the inside surface of housing 101 while a drip irrigation emitter is driven into aperture 129 as disclosed herein. Upper end portion 128 can include ejector port 178 which is adapted to permit ejector shoe 177 to traverse upper end portion 128 when ejector 173 is in an extended position as disclosed herein.

End portions 128 can incorporate receiving portions 131 which are adapted to permit upper magazine end 142 to be positioned within sleeve 102 when magazine 107 is installed within handle 106. In the embodiment depicted in FIGS. 15 and 16, receiving portions 131 are angled such that they are adapted to permit upper magazine end 142 to be positioned within sleeve 102 at an angle such that upper magazine end 142 is biased towards the front end of the device and cradle 104. As disclosed herein, the invention can be practiced with the device wherein handle 106 is coupled to housing 101 at a 90-degree angle such that the longitudinal axis of handle 106 and the longitudinal axis of housing 101 are perpendicular to one another. In such embodiments, end portions 128 will have an equal length and receiving portions 131 will have surfaces that are perpendicular to the longitudinal axis of sleeve 102 and parallel to the longitudinal axis of magazine 107 when magazine 107 is installed within handle 106.

Still referring to FIGS. 15 and 16, sleeve arms 126 are separated from one another to form a void that is suitable for receiving plunger body 134 in a slidable relationship that permits plunger 103 to slide between sleeve arms 126 when the device assumes the activation and retraction states disclosed herein. Sleeve arms 126 are separated from one another by a dimension that is suitable to receive upper magazine end 142. It will be appreciated that sleeve arms 126 can be separated from one another by the same distance at both the forward and rear end of sleeve 102. The ends of sleeve arms 126 can include divots 171 which are adapted to collect dirt and debris so as to prevent dirt and debris from compromising the free travel of sleeve 102 within housing 101.

FIG. 17 depicts a plan view of sleeve 102. FIG. 17 shows that end portions 128 incorporate end portion surfaces 132 which face the rear end of sleeve 102. End portion surfaces 132 can be chamfered so as to guide a drip irrigation emitter that is fed from upper magazine end 142 into aperture 129 under the force of plunger 103. Lower end portion 128 incorporates inlet gap 133 which permits a drip irrigation emitter to be fed into sleeve 102 from magazine 107 without the inlet of the emitter contacting lower end portion 128 as the emitter is fed upwards into sleeve 102.

Figure 18:
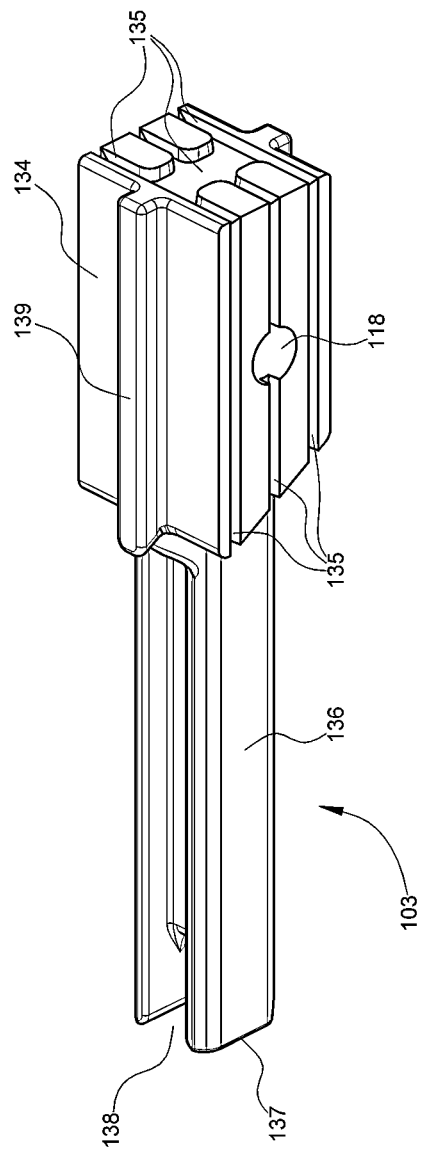
FIGS. 18 and 19 show a bottom perspective view of a plunger for use with the invention.
Figure 19:
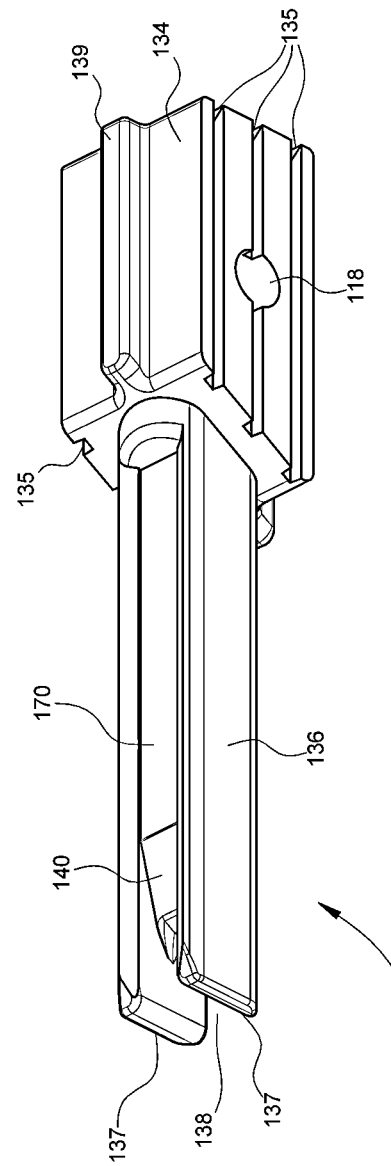

FIGS. 18 and 19 show a non-limiting embodiment of plunger 103. In this embodiment, plunger 103 includes plunger pin opening 118 which traverses the width of plunger body 134 and is adapted to receive plunger pin 112. Plunger body 134 can have a dimension that is sufficient to nest between sleeve arms 126 of sleeve 102 so as to permit plunger 103 to slide within sleeve 102 when the device assumes the activation and retraction states disclosed herein. Plunger body 134 can have a width that is the same as, or slightly less than, the distance between sleeve arms 126 so as to permit plunger body 134 to slide freely between sleeve arms 126. Plunger body 134 can have plunger grooves 135 which are adapted to collect dirt and debris that enters housing 101 which could otherwise compromise the free travel of plunger 103 within sleeve 102. Housing 101 can include an opening on its rearward surface to permit the inside of housing to be flushed, such as with water, to remove dirt and debris from the inside of housing 101, including from plunger grooves 135 and divots 171.

Plunger 103 includes plunger ram 136 which has a dimension that is adapted to pass through aperture 144 in upper magazine end 142 in magazine 107 when the device assumes the activation and retraction states disclosed herein. Plunger ram 136 terminates in plunger end 137. Plunger end 137 can be have a surface that is adapted to mate with the upper surface of the body of a drip irrigation emitter. The surface of plunger end 137 can be flat such that when plunger end 137 contacts the upper surface of the body of a drip irrigation emitter housed within aperture 144, the drip irrigation emitter rotates to assume an orientation wherein the upper surface of the emitter is flush against plunger end 137 when the device assumes the third activation state discussed under FIG. 7.

Plunger 103 can include plunger recess 138 which is adapted to receive the spout of a drip irrigation emitter. Plunger recess 138 permits the upper surface of the body of a drip irrigation emitter to abut plunger end 137 without the spout of the emitter interfering with the contact between the upper surface of the emitter and the surface of plunger end 137. Plunger 103 can include plunger rib 139. Plunger rib 139 can be adapted to interface with a groove in housing 101 so as to guide the movement of plunger 103 through sleeve 102 as the separation between sleeve arms 126 provides a void that permits plunger rib 139 to interface with the groove in housing 101.

The bottom surface of plunger ram 136 can include retaining surface 170 and plunger ramp 140. Retaining surface 170 is adapted to contact the top drip irrigation emitter in magazine 107 to prevent the emitter from advancing into aperture 144 of upper magazine end 142 while plunger ram 136 is traveling through aperture 144 during the activation and retraction states disclosed herein. Plunger ramp 140 is biased so as to permit a drip irrigation emitter to slide into aperture 144 in upper magazine end 142 when retaining surface 170 clears the drip irrigation emitter during the third retraction state discussed under FIG. 11. The bias of plunger ramp 140 also provides an angled surface that pushes the top drip irrigation emitter within magazine 107 downward and into magazine 107 during the forward travel of plunger 103 so as to prevent the top emitter from interfering with the travel of plunger 103 during the activation states disclosed herein.

Figure 20:
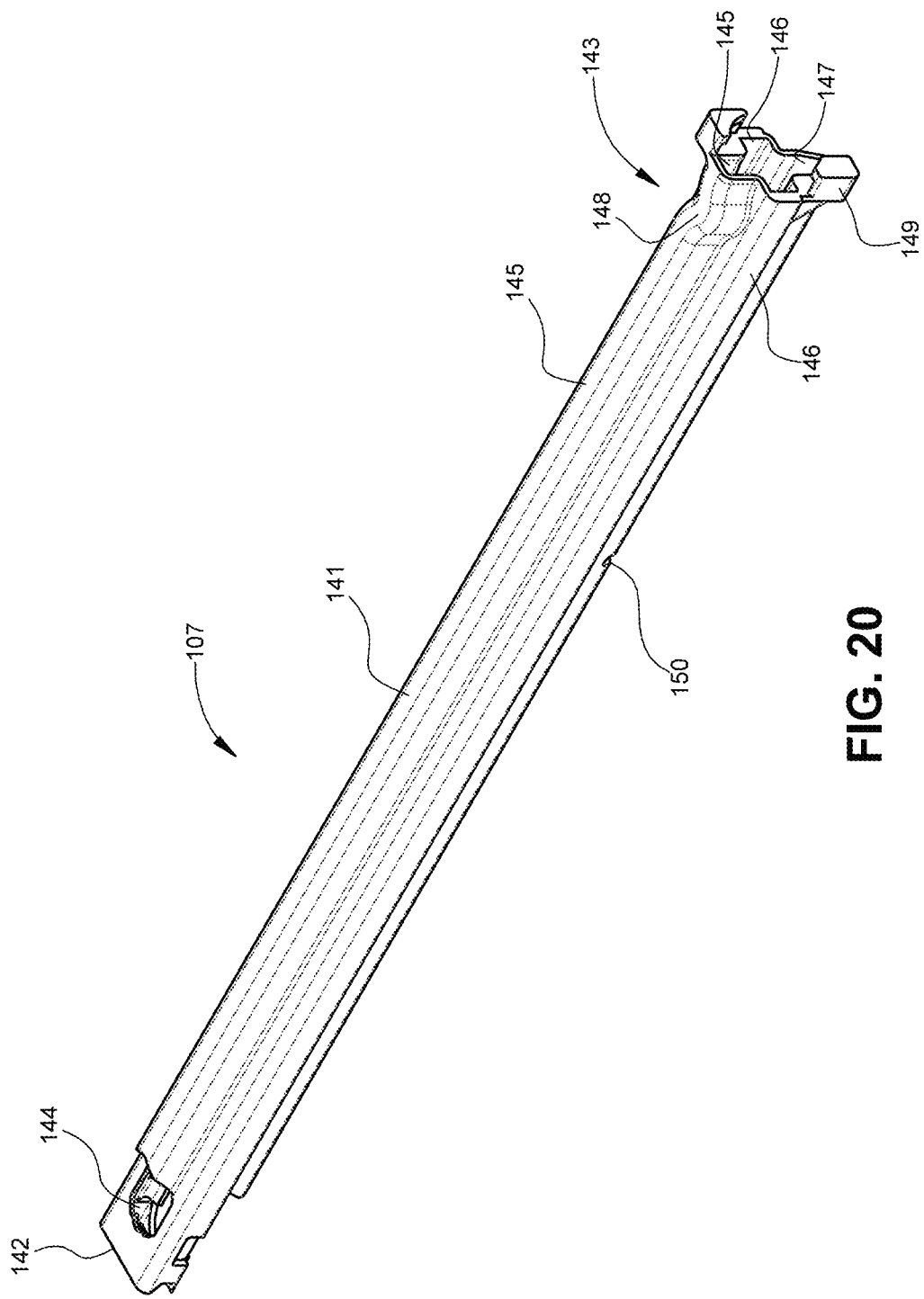
FIG. 20 shows a rear perspective view of a magazine for use with the invention.

FIG. 20 shows a top perspective view of a non-limiting embodiment for magazine 107 which comprises magazine body 141 which terminates in upper magazine end 142 and lower magazine end 143. Magazine body 141 is adapted to be installed within handle 106 wherein upper magazine end 142 is fed into the bottom of handle 106. Magazine body 141 comprises notch 150 that interfaces with magazine latch 109 at the bottom of handle 106 so as to retain magazine 107 within handle 106. Upper magazine end 142 comprises aperture 144 which is adapted to retain a drip irrigation emitter in an orientation suitable for feeding the emitter into aperture 129 of sleeve 102 under the force of plunger 103. Aperture 144 has a dimension sufficient to permit plunger ram 136 to traverse aperture 144 so as to force a drip irrigation emitter housed within aperture 144 into aperture 129 of sleeve 102.

Magazine body 141 includes spout channel 145, body channel 146, and inlet channel 147. Spout channel 145 is adapted to receive the spout of a drip irrigation emitter, while body channel 146 is adapted to receive the body of the emitter and inlet channel 147 is adapted to receive the inlet of the emitter. Together, spout channel 145, body channel 146 and inlet channel 147 create a void within magazine body 141 that is adapted to receive and house a plurality of drip irrigation emitters in a linear series.

Figure 23:
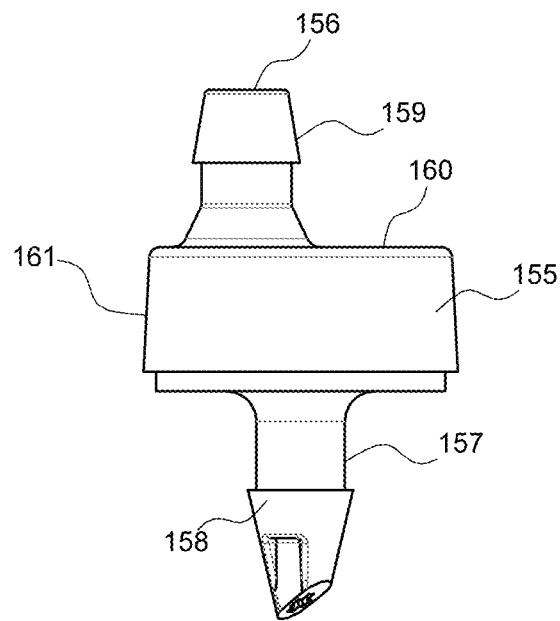
FIGS. 23 and 24 show non-limiting embodiments of drip irrigation emitters for use with the invention.

In some embodiments, spout channel 145 includes orienting portion 148 which is adapted for use with offset drip irrigation emitters having a spout that is offset from the center of the body of the emitter as depicted in FIG. 23, for example. Orienting portion 148 forms a curve, or depression, in spout channel 145 which descends below the longitudinal axis of spout channel 145. Orienting portion 148 functions to align the spout of offset drip irrigation emitters as the emitters are fed into lower magazine end 143 such that the edge of the drip irrigation emitter nearest the spout trails the opposite edge of the drip irrigation emitter. Such an orientation of a plurality of offset drip irrigation emitters housed within magazine 107 is depicted in FIG. 1. Offset drip irrigation emitters suitable for use with the invention include, but are not necessarily limited to, the following Rainbird™ irrigation emitters: SW05, 0.5 GPH Spot Watering Emitters (SKU A50803); SW10, 1.0 GPH Spot Watering Emitters (SKU A50804); and SW20, 2.0 GPH Spot Watering Emitters (SKU A50805).

Figure 24:
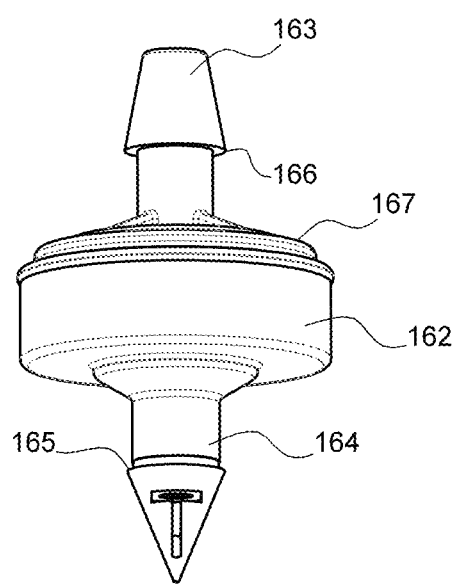

It will be appreciated that the device of the invention can be used with drip irrigation emitters having a spout that is centered in the body of the emitter, such as the emitter depicted in FIG. 24. In such applications, spout channel 145 lacks orienting portion 148 such that spout channel 145 forms a straight void through magazine body 141. Drip irrigation emitters lacking an offset spout that are suitable for use with the invention include, but are not necessarily limited to, the following Rainbird™ irrigation emitters: PC05, Pressure-Compensating Module, Barb Inlet, 5.0 GPH (SKU x71005), PC07, Pressure-Compensating Module, Barb Inlet, 7.0 GPH (SKU x71007), PC10, Pressure-Compensating Module, Barb Inlet, 10.0 GPH (x71010), PC12, Pressure-Compensating Module, Barb Inlet, 12.0 GPH (SKU x71012), PC18, Pressure-Compensating Module, Barb Inlet, 18.0 GPH (SKU X71018), PC24, Pressure-Compensating Module, Barb Inlet, 24.0 GPH (SKU x71024). Other manufacturers of drip irrigation emitters for use with the device include, but are not necessarily limited to, Netafim (Israel), Jain (China), Hunter Industries (U.S.), NDS (U.S.), Toro (U.S), DIG Corp. (U.S.), IRRITEC SpA (Italy), OASE (Germany), Rough Bros. (U.S.), DRIP-WORKS, Inc. (U.S.), and Morrill Industries (U.S.).

Magazine 107 includes magazine closure 149 which is adapted to interface with the bottom end of telescoping magazine rod 110 in a locking relationship so as to retain telescoping magazine rod 110 within magazine 107. Magazine closure 149 can comprise features that are adapted to interface with complimentary features on the bottom end of telescoping magazine rod 110. Such features can include one or more slots that mate with tabs on the bottom end of telescoping magazine rod 110 by rotating the end of the magazine rod such that the tabs occupy the slots in a locking relationship.

Figure 21:
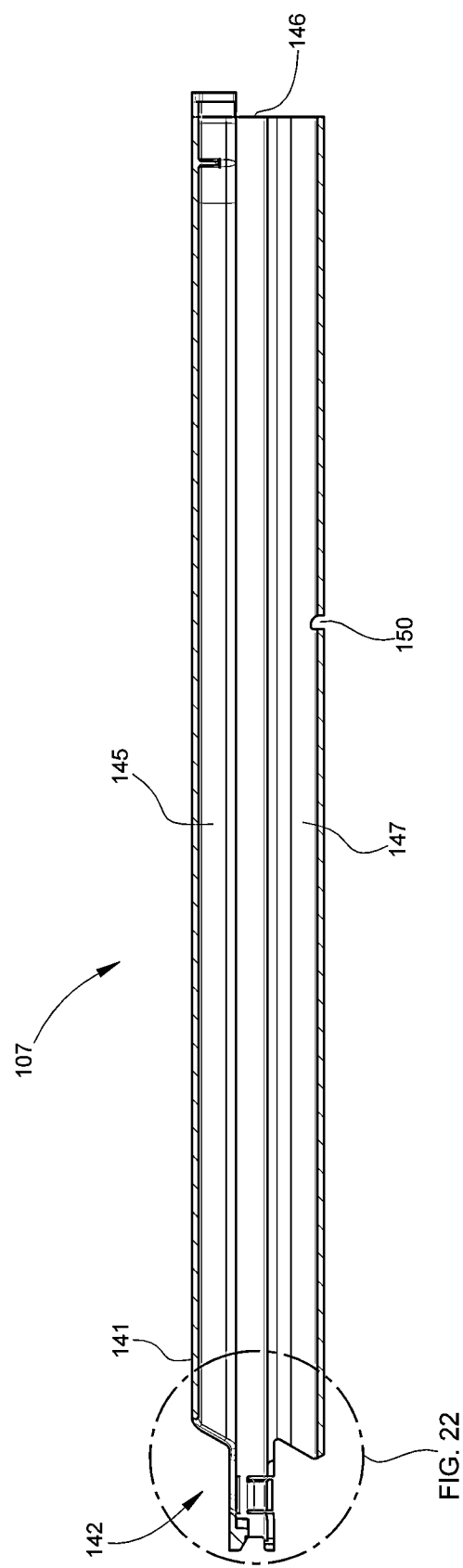
FIG. 21 shows a cross-sectional view of a magazine for use with the invention.

FIG. 21 shows a cross-sectional view of magazine 107 with telescoping magazine rod 110 and magazine follower 172 removed wherein spout channel 145 is shown above body channel 146 and inlet channel 147. As shown in FIG. 21, body channel 146 extends beyond spout channel 145 and inlet channel 147 to form upper magazine end 142. Thus, when a drip irrigation emitter is housed within aperture 144, the body of the emitter remains enshrouded by body channel 146, while the spout and inlet of the emitter are exposed. Magazine body 141 includes latch notch 150 which is adapted to interface with magazine latch 109 to retain magazine 107 within handle 106.

Figure 22:
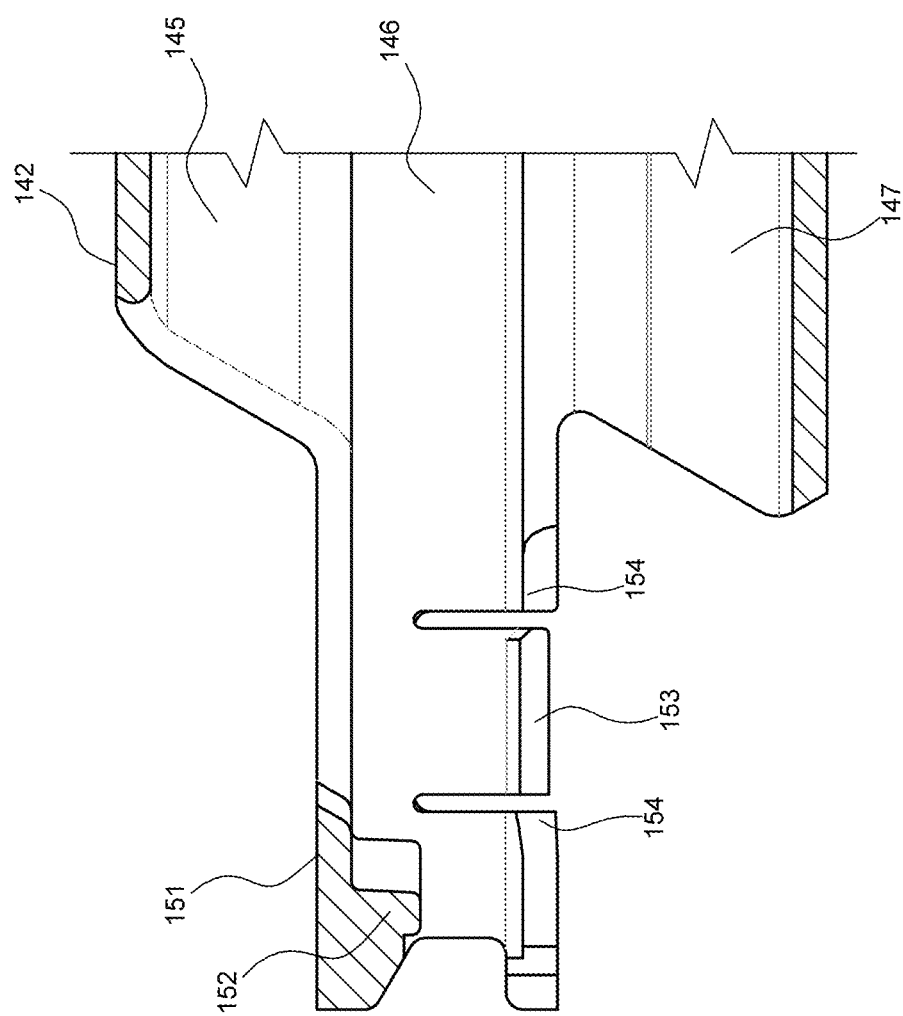
FIG. 22 shows the upper end of the magazine from FIG. 21.

FIG. 22 shows upper magazine end 142 from FIG. 21, wherein upper magazine end 142 comprises magazine shroud 151. Magazine shroud 151 is adapted to contact the upper surface of a drip irrigation emitter housed within aperture 144 so as to prevent the emitter from tilting so that the emitter is maintained in a stable orientation for contact with plunger 103 when the device is activated. Magazine shroud 151 features shroud rib 152 which abuts the side of the body of a drip irrigation emitter housed within aperture 144, wherein the side of the body of the emitter remains in contact with shroud rib 152 under the force of telescoping magazine rod 110. Upper magazine end 142 includes a pair of opposing channel tabs 153 which form a portion of the opposing walls of body channel 146. Channel tabs 153 have a space between them that is smaller than the diameter of the body of a drip irrigation emitter such that tabs contact the sides of the body of the emitter and hold the emitter under tension within aperture 144. Channel slots 154 permit channel tabs 153 to flex away from the internal space within body channel 146 when a drip irrigation emitter is chambered into aperture 144 thereby providing tension against the sides of the body of the emitter so that channel tabs 153 cooperate with magazine shroud 151 and shroud rib 152 to maintain the emitter in a stable orientation in aperture 144.

It will be appreciated that the device can be practiced with a magazine wherein drip irrigation emitters are loaded in the upper end of the magazine. In such an embodiment, the telescoping magazine rod would be fixed within the magazine and the magazine would omit magazine closure 149. The magazine could include the other features disclosed in magazine 107, such as spout channel 145, body channel 146, orienting portion 148, and latch notch 150. In the upper-end loading magazine embodiment, orienting portion 148 would be positioned near the upper end of the magazine.

The loading of magazine 107 with drip irrigation emitters is practiced by a user opening magazine closure 149, such as by rotating the end of telescoping magazine rod 110 so as to disengage tabs on the end of the magazine rod from slots in magazine closure 149. Once magazine closure 149 is opened, telescoping magazine rod 110 and magazine follower 172 are withdrawn from magazine body 141 so as to expose the opening produced by spout channel 145, body channel 146 and inlet channel 147. A drip irrigation emitter is then inserted into the opening so that the spout, body and inlet of the emitter are received within spout channel 145, body channel 146 and inlet channel 147, respectively. When the loading of magazine 107 is practiced with drip irrigation emitters having a spout that is offset from the center of the body of the drip irrigation emitter such as depicted in FIG. 23 for example, magazine 107 features orienting portion 148, wherein inserting the emitter within the magazine causes orienting portion 148 to rotate the emitter as the spout of the emitter passes through orienting portion 148 such that the side of the emitter nearest the spout is oriented towards lower magazine end 143. The insertion step of drip irrigation emitters can be repeated so that the magazine is filled with a plurality of emitters. Telescoping magazine rod 110 having magazine follower 172 attached thereto is then inserted into lower magazine end 143 such that magazine follower 172 contacts the last-loaded emitter and the telescoping magazine rod 110 is compressed such that it collapses upon itself thereby loading the spring housed within telescoping magazine rod 110. With telescoping magazine rod 110 installed within magazine 107, magazine follower 172 contacts the side of the body of the drip irrigation emitter nearest lower magazine end 143 thereby forcing the plurality of emitters within magazine 107 towards upper magazine end 142. The end of telescoping magazine rod 110 is then rotated causing tabs on the end of the magazine rod to engage with slots on magazine closure 149 thereby retaining telescoping magazine rod 110 within magazine 107. In this state, the drip irrigation emitter nearest upper magazine end 142 is housed within aperture 144 and held in a stable configuration as the sides and upper surface of the body of the emitter are maintained in contact with magazine shroud 151, shroud rib 152 and channel tabs 153 as disclosed herein. Loaded magazine 107 can then be installed in handle 106 to permit magazine latch 109 to engage latch notch 150 thereby retaining magazine 107 within handle 106.

With the loaded magazine 107 installed within handle 106, the device assumes the resting state described herein under FIG. 4. The device is then is ready to repeatedly install drip irrigation emitters in drip irrigation tubing. A first drip irrigation emitter is then installed by placing a section of drip irrigation tubing within cradle 104. Trigger 111 is then compressed towards handle 106 so that the force of the movement of trigger 111 is transferred to plunger pin 112 through rotating cooperation of trigger ears 113 and linking bodies 116 such that the device assumes the active states disclosed herein. Briefly, compression of trigger 111 causes plunger 103 to slidably advance through sleeve 102 towards the section of drip irrigation tubing within cradle 104. Advancement of plunger 103 causes the surface of plunger end 137 to contact the drip irrigation emitter chambered in aperture 144. Continued advancement of plunger 103 towards the section of drip irrigation tubing within cradle 104 leads the drip irrigation emitter chambered in aperture 144 to rotate such that the upper surface of the emitter becomes flush with the surface of plunger end 137 while the spout of the emitter is received within plunger recess 138. Continued advancement of plunger 103 causes plunger body 134 to travel through aperture 144 forcing the drip irrigation emitter into aperture 129 of sleeve 102. Plunger 103 further advances under the compression of trigger 111 leading plunger pin 112 to contact the forward end of sleeve slots 119 thereby forcing sleeve 102 together with plunger 103 towards cradle 104 with a drip irrigation emitter retained within aperture 129 of sleeve 102. Continued advancement of plunger 103 with the drip irrigation emitter retained within aperture 129 of sleeve 102 causes the barbed inlet of the drip irrigation emitter to pierce the wall of the section of drip irrigation tubing in cradle 104 thereby installing the drip irrigation emitter in the section of drip irrigation tubing.

The user's grip is then relaxed on trigger 111 causing the device to assume the retraction states disclosed herein. Briefly, the relaxation of the user's grip on trigger 111 causes plunger 103 to retract within sleeve 102 away from the drip irrigation emitter which remains installed in the section of drip irrigation tubing under the friction of the barb on the emitter inlet. Plunger 103 retracts away from the section of drip irrigation tubing in cradle 104 under the force of springs 120 which were loaded by the compression of trigger 111 towards handle 106. As plunger 103 retracts within sleeve 102, plunger pin 112 travels freely through sleeve slots 119 until plunger pin 112 contacts the rear end of sleeve slots 119 thereby causing sleeve 102 to retract away from the installed drip irrigation emitter together with plunger 103. Plunger 103 and sleeve 102 retract together into housing 101 until the rearward end of sleeve 102 and the rearward end of plunger 103 contact the rearward, inside surface of housing 101 whereupon a second drip irrigation emitter advances into aperture 144 with the inlet of the second emitter passing through inlet gap 133 on sleeve 102. With the second drip irrigation emitter housed within aperture 144, the device assumes the resting state disclosed herein such that the device is ready to install a second drip irrigation emitter into another section of drip irrigation tubing. The activation and retraction states disclosed herein can be then be repeated to install a plurality of drip irrigation emitters.

FIG. 23 shows a non-limiting embodiment of an offset drip irrigation emitter for use with the invention. The offset drip irrigation emitter comprises drip irrigation emitter body 155, spout 156 and inlet 157. Inlet 157 preferably has a point that is adapted to pierce the wall of drip irrigation tubing under the force of plunger 103 as disclosed herein. The point can be biased such that the point is angled on one side. Inlet 157 includes inlet barb 158 which is adapted to retain inlet 157 within a section of drip irrigation. Spout 156 can include spout barb 159 which is adapted to retain spout 156 within the end of a section of distribution tubing. Spout 156 protrudes from upper emitter surface 160 such that spout 156 is offset from the center of upper emitter surface 160 and nearest emitter body side 161.

FIG. 24 shows a non-limiting embodiment of a drip irrigation emitter having a centered spout for use with the invention. The drip irrigation emitter comprises drip irrigation emitter body 162, spout 163 and inlet 164. Inlet 164 preferably has a point that is adapted to pierce the wall of drip irrigation tubing under the force of plunger 103 as disclosed herein. The point can be biased such that the point is angled on one side. Inlet 164 includes inlet barb 165 to permit the drip irrigation emitter to be retained within a section of drip irrigation tubing. Spout 163 can include spout barb 166 which is adapted to retain spout 163 within the end of a section of distribution tubing. Spout 163 protrudes from upper emitter surface 167 such that spout 163 is centered on upper emitter surface 167.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

REFERENCE CHARACTERS

101—Housing
102—Sleeve
103—Plunger
104—Cradle
105—Cradle Sides
106—Handle
107—Magazine
108—Drip Irrigation Emitter
109—Magazine Latch
110—Telescoping Magazine Rod
111—Trigger
112—Plunger Pin
113—Trigger Ears
114—Trigger Screws
115—Trigger Screw Threads
116—Linking Bodies
117—Housing Slots
118—Plunger Pin Opening
119—Sleeve Slots
120—Springs
121—Spring Mounts
122—Spring Ends
123—Receiving Portions
124—Spring Ends
125—Section of Drip Irrigation Tubing 126—Sleeve Arms
127—Sleeve Slot Offsets
128—End Portions
129—Aperture
130—Sleeve Gaps
131—Receiving Portions
132—End Portion Surfaces
133—Inlet Gap
134—Plunger Body
135—Plunger Grooves
136—Plunger Ram
137—Plunger End
138—Plunger Recess
139—Plunger Rib
140—Plunger Ramp
141—Magazine Body
142—Upper Magazine End
143—Lower Magazine End
144—Aperture
145—Spout Channel
146—Body Channel
147—Inlet Channel
148—Orienting Portion
149—Magazine Closure
150—Latch Notch
151—Magazine Shroud
152—Shroud Rib
153—Channel Tabs
154—Channel Slots
155—Drip Irrigation Emitter Body
156—Spout
157—Inlet
158—Inlet Barb
159—Spout Barb
160—Upper Emitter Surface
161—Emitter Body Side
162—Emitter Body
163—Spout
164—Inlet
165—Inlet Barb
166—Spout Barb
167—Upper Emitter Surface
168—Clip
169—Extension
170—Retaining Surface
171—Divots
172—Magazine Follower
173—Ejector
174—Ejector Mount
175—Magazine Spring
176—Ejector Spring
177—Ejector Shoe
178—Ejector Port
179—Ejector Shoulders

The invention claimed is:

1. A device for repeatedly installing drip irrigation emitters, comprising:
   a) a housing;
   b) a sleeve slidably disposed in said housing, wherein said sleeve is adapted to receive a drip irrigation emitter from a magazine that is adapted to contain a plurality of drip irrigation emitters;
   c) a plunger, wherein said plunger is adapted to slide through said sleeve; and
   d) a cradle that is adapted to receive a section of drip irrigation tubing.

2. The device of claim 1, wherein said plunger is adapted to drive said sleeve with a drip irrigation emitter received therein towards said cradle.

3. The device of claim 1, wherein said plunger is adapted to drive said drip irrigation emitter into a section of drip irrigation tubing that is nested within said cradle.

4. The device of claim 1, wherein said sleeve is adapted to maintain a drip irrigation emitter retained within said sleeve in a constant orientation as said sleeve and said retained drip irrigation emitter are driven by said plunger towards said cradle.

5. The device of claim 1, wherein said sleeve is adapted to receive said drip irrigation emitter from said magazine at an acute angle.

6. The device of claim 1, wherein said plunger is adapted to rotate said drip irrigation emitter to render a bisecting axis of said drip irrigation emitter substantially perpendicular to a longitudinal axis of said sleeve when said plunger drives said drip irrigation emitter towards said cradle.

7. The device of claim 1, further comprising said magazine.

8. The device of claim 7, wherein said magazine is adapted to contain a plurality of drip irrigation emitters each having a spout and an inlet.

9. The device of claim 8, wherein said magazine comprises a channel that is adapted to receive said spouts.

10. The device of claim 9, wherein said channel is adapted to receive spouts that are offset from a center of said drip irrigation emitters.

11. The device of claim 10, wherein said channel comprises an orienting portion that is adapted to orient said spouts towards a rear of said magazine as said drip irrigation emitters are fed into said magazine.

12. The device of claim 11, wherein said orienting portion comprises a depression in said channel.

13. The device of claim 1, wherein said device further comprises a handle that is adapted to receive said magazine.

14. The device of claim 13, wherein said device has a rear end and a bottom of said handle is slanted towards said rear end.

15. The device of claim 1, wherein said device further comprises an ejector that is adapted to eject a drip irrigation emitter that is retained within said sleeve.

16. A method of installing a drip irrigation emitter, comprising:
   a) providing a device according to claim 1;
   b) placing a magazine containing at least one drip irrigation emitter in said device; and
   c) activating said plunger to drive a drip irrigation emitter from said magazine into a section of drip irrigation tubing.

17. The device of claim 1, wherein said plunger is adapted to force a drip irrigation emitter into an aperture in an end of said sleeve.

18. The device of claim 1, wherein said sleeve comprises a pair of opposing sleeve arms that are joined to one another at a forward end of said sleeve.

19. A magazine for repeatedly installing drip irrigation emitters, comprising:
   a magazine body, wherein said magazine body comprises:
      a) a first channel having a first width, wherein said first channel is adapted to receive a body of a drip irrigation emitter;
      b) a second channel having a second width, wherein said second channel is adapted to receive a spout of a drip irrigation emitter; and c) a third channel having a third width, wherein said third channel is adapted to receive an inlet of a drip irrigation emitter;

wherein said first width is greater than said second width and said third width.

20. The magazine of claim 19, further comprising at least one drip irrigation emitter loaded within said magazine body.

21. The magazine of claim 19, wherein said second channel comprises an orienting portion that is adapted to orient a spout of a drip irrigation emitter that is offset from a center of said drip irrigation emitter towards a rear of said magazine as said drip irrigation emitter is fed into said magazine.

22. The magazine of claim 21, wherein said orienting portion comprises a depression in said second channel.

* * * * *